United States Patent
Son et al.

(10) Patent No.: US 10,736,109 B2
(45) Date of Patent: Aug. 4, 2020

(54) APPARATUS AND METHOD FOR TRANSMITTING AND RECEIVING BEAM INFORMATION IN WIRELESS COMMUNICATION SYSTEM

(71) Applicant: Samsung Electronics Co., Ltd., Gyeonggi-do (KR)

(72) Inventors: Jae-Seung Son, Gyeonggi-do (KR); Chan-Hong Kim, Gyeonggi-do (KR); Tae-Young Kim, Gyeonggi-do (KR); Ji-Yun Seol, Gyeonggi-do (KR); Keon-Kook Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/025,532

(22) PCT Filed: Sep. 25, 2014

(86) PCT No.: PCT/KR2014/008923
§ 371 (c)(1),
(2) Date: Mar. 28, 2016

(87) PCT Pub. No.: WO2015/046895
PCT Pub. Date: Apr. 2, 2015

(65) Prior Publication Data
US 2016/0241322 A1      Aug. 18, 2016

(30) Foreign Application Priority Data

Sep. 27, 2013 (KR) ........................ 10-2013-0115280

(51) Int. Cl.
*H04B 7/06* (2006.01)
*H04W 72/10* (2009.01)
(Continued)

(52) U.S. Cl.
CPC ........ *H04W 72/046* (2013.01); *H04B 7/0417* (2013.01); *H04B 7/0452* (2013.01);
(Continued)

(58) Field of Classification Search
CPC .......................... H04B 7/0617; H04W 72/046
(Continued)

(56) References Cited

U.S. PATENT DOCUMENTS 8,897,403 B2 * 11/2014 Stirland .................. H01Q 3/40
342/368
9,602,267 B2   3/2017 Takaoka et al.
(Continued)

FOREIGN PATENT DOCUMENTS

| CN | 101796765 A | 8/2010 |
|---|---|---|
| CN | 102017447 A | 4/2011 |

(Continued)

OTHER PUBLICATIONS

International Search Report dated Dec. 19, 2014 in connection with International Application PCT/KR2014/008923; 6 pages.
(Continued)

*Primary Examiner* — Iqbal Zaidi

(57) ABSTRACT

The present disclosure relates to transmitting and receiving beam information in a wireless communication system. An operation of a receiving end includes: generating a signal indicating two or more analogue transmission beams which are allocable to the receiving end; and transmitting the signal. In addition, the present disclosure includes other embodiments different from the embodiment described above.

17 Claims, 19 Drawing Sheets

(51) Int. Cl.
  *H04W 72/08* (2009.01)
  *H04W 72/04* (2009.01)
  *H04B 7/0417* (2017.01)
  *H04B 7/0452* (2017.01)

(52) U.S. Cl.
  CPC ......... *H04B 7/0617* (2013.01); *H04B 7/0695* (2013.01); *H04W 72/08* (2013.01); *H04W 72/10* (2013.01)

(58) Field of Classification Search
  USPC ........................... 370/328–339; 375/262–267
  See application file for complete search history.

(56) References Cited

U.S. PATENT DOCUMENTS

| | | | | |
|---|---|---|---|---|
| 2004/0014429 | A1* | 1/2004 | Guo | H04B 7/0632 455/73 |
| 2009/0067382 | A1 | 3/2009 | Li et al. | |
| 2010/0112952 | A1* | 5/2010 | Molnar | H01Q 1/246 455/63.1 |
| 2010/0267341 | A1 | 10/2010 | Bergel et al. | |
| 2010/0295730 | A1 | 11/2010 | Jeon | |
| 2011/0064033 | A1 | 3/2011 | Gong et al. | |
| 2011/0134852 | A1 | 6/2011 | Cordeiro | |
| 2011/0249588 | A1 | 10/2011 | Petersson et al. | |
| 2011/0280197 | A1 | 11/2011 | Brueck et al. | |
| 2012/0155378 | A1* | 6/2012 | Kim | H04B 7/18515 370/319 |
| 2012/0162009 | A1 | 6/2012 | Kim et al. | |
| 2012/0307738 | A1 | 12/2012 | Morioka | |
| 2013/0059619 | A1 | 3/2013 | Kim et al. | |
| 2013/0072243 | A1 | 3/2013 | Yu et al. | |
| 2013/0077445 | A1 | 3/2013 | Um et al. | |
| 2013/0182683 | A1 | 7/2013 | Seol et al. | |
| 2013/0223251 | A1 | 8/2013 | Li et al. | |
| 2013/0279403 | A1 | 10/2013 | Takaoka et al. | |
| 2015/0049824 | A1 | 2/2015 | Kim et al. | |
| 2017/0163317 | A1 | 6/2017 | Kim | |

FOREIGN PATENT DOCUMENTS

| | | | |
|---|---|---|---|
| CN | 102257743 | A | 11/2011 |
| KR | 10-2012-0072938 | A | 7/2012 |
| KR | 10-2012-0097523 | A | 9/2012 |
| KR | 10-2013-0016201 | A | 2/2013 |
| KR | 10-2013-0084340 | A | 7/2013 |
| WO | 2011/083774 | A1 | 7/2011 |
| WO | 2013133645 | A1 | 9/2013 |
| WO | WO 2013/133645 | A1 | 9/2013 |

OTHER PUBLICATIONS

Written Opinion of the International Searching Authority dated Dec. 19, 2014 in connection with International Application PCT/KR2014/008923; 7 pages.
European Patent Office, "Supplementary European Search Report," Application No. EP 14849964, dated May 11, 2017, 9 pages.
Non-Final Office Action for U.S. Appl. No. 15/488,287, dated Sep. 26, 2017. (30 pages).
Communication Pursuant to Article 94(3) EPC for European Patent Application No. 14849964.3 dated Mar. 23, 2018; 6 pages.
Final Office Action for U.S. Appl. No. 15/488,287 dated May 3, 2018; 19 pages.
Communication pursuant to Article 94(3) EPC dated Apr. 15, 2019 in connection with European Patent Application No. 14 849 964.3, 6 pages.
Office Action dated Sep. 28, 2018 in connection with European Patent Application No. 14 849 964.3, 6 pages.
Office Action dated Jul. 4, 2018 in connection with Chinese Patent Application No. 201480059011.5.
Notice of Allowance dated Jul. 17, 2018 in connection with U.S. Appl. No. 15/488,287.
Communication pursuant to Article 94(3) EPC in connection with European Application No. 14849964.3 dated Feb. 5, 2020, 6 pages.
Examination report in connection with Indian Application No. 201637012996 dated Apr. 28, 2020, 6 pages.
Notice of Preliminary Rejection in connection with Korean Application No. 10-2013-0155280 dated Jun. 8, 2020, 12 pages.
Notice of Preliminary Rejection in connection with Korean Application No. 10-2020-0012752 dated Jun. 8, 2020, 14 pages.

* cited by examiner

: AREA ALLOWING SCHEDULING WHEN BEAMFORMING IS PERFORMED

: AREA ALLOWING SCHEDULING WHEN BEAMFORMING IS NOT PERFORMED

| BEST BEAM ID FIELD ||
|---|---|
| VALUE | INDICATED INFORMATION |
| 0000 | BEAM #1 |
| 0001 | BEAM #2 |
| 0010 | BEAM #3 |
| ⋮ | ⋮ |
| 1001 | BEAM #10 |
| 1011 | RESERVED |
| 1110 | SBQI ON |
| 1111 | SBQI OFF |

BEAM INDICATION RANGE (510): 0000–1001
SBQI INDICATION RANGE (520): 1011–1111
521 — 1110
522 — 1111

FIG.5

| BITMAP (710) | $b_0$ | $b_1$ | $b_2$ | $b_3$ | $b_4$ | $b_5$ | $b_6$ | $b_7$ | $b_8$ | $b_9$ | $b_{10}$ | $b_{11}$ | $b_{12}$ | $b_{13}$ | $b_{14}$ | $b_{15}$ |
|---|---|---|---|---|---|---|---|---|---|---|---|---|---|---|---|---|
| CORRESPONDING BEAM ID | 1 | 2 | 3 | 4 | 5 | 6 | 7 | 8 | 9 | 10 | 11 | 12 | 13 | 14 | 15 | 16 |

FIG.7

APPARATUS AND METHOD FOR TRANSMITTING AND RECEIVING BEAM INFORMATION IN WIRELESS COMMUNICATION SYSTEM

CROSS-REFERENCE TO RELATED APPLICATIONS AND CLAIM OF PRIORITY

The present application claims priority under 35 U.S.C. § 365 to International Patent Application No. PCT/KR2014/008923 filed Sep. 25 2014, entitled "APPARATUS AND METHOD FOR TRANSMITTING AND RECEIVING BEAM INFORMATION IN WIRELESS COMMUNICATION SYSTEM", and, through International Patent Application No. PCT/KR2014/008923, to Korean Patent Application No. 10-2013-0115280 filed Sep. 27, 2013, each of which are incorporated herein by reference into the present disclosure as if fully set forth herein.

BACKGROUND

1. Technical Field

Exemplary embodiments of the present disclosure relate to transmitting and receiving beam-related information in a wireless communication system.

2. Description of the Related Art

Wireless communication systems are developing to support a higher data transfer rate to satisfy an increasing demand for wireless data traffic. The $4^{th}$ Generation (4G) system which is commonly used in recent years has been developed with the aim of enhancing spectral efficiency to increase the data transfer rate. However, the enhancement in the spectral efficiency is not expected to satisfy the increasing demand for wireless data traffic.

As a solution for providing a higher data transfer rate, use of a broader frequency band may be considered. The present mobile communication cellular system uses a bandwidth of about 5 GHz. However, since the frequency is a finite resource, it is difficult to guarantee the broader frequency band. Therefore, there is a need for a method for guaranteeing a wideband frequency at a higher frequency rather than a currently used band.

As the frequency for wireless communication increases, a propagation path loss increases. Due to the propagation path loss, a propagation distance is relatively shortened and thus a service coverage is reduced. As one of the important techniques for solving these problems, that is, reducing the propagation path loss and increasing the propagation distance, beamforming is being in the spotlight.

Beamforming for transmission, which is performed for transmission signals, normally uses a plurality of antennas to focus signals transmitted from the antennas in a specific direction. A set of a plurality of antennas may be referred to as an array antenna, and each of the antennas included in the array antenna may be referred to as an antenna element. The beamforming for transmission can increase a propagation distance of signals and also rarely transmits signals in other directions, so that interference on other users can be greatly reduced. A receiving side may perform beamforming for reception with respect to reception signals using a reception array antenna. The beamforming for reception increases sensitivity of reception signals entering in a corresponding direction by focusing reception of waves in a specific direction, and blocks interference signals by excluding signals received in directions other than the corresponding direction.

In addition, as a transmission frequency increases, a wavelength of waves decreases. Therefore, when a half-wave antenna is provided, the array antenna can be configured by more antenna elements in the same area. That is, when a high frequency band is used, a higher antenna gain can be obtained than when beamforming is applied in a low frequency band.

SUMMARY

To address the above-discussed deficiencies, it is a primary object to provide an apparatus and method for efficiently scheduling in a wireless communication system based superhigh frequency beamforming.

Another object of the present disclosure is to provide an apparatus and method for managing efficient scheduling in a wireless communication system when different wireless environment coexist.

Another object of the present disclosure is to provide an apparatus and method for uplink signaling and scheduling in a wireless communication system.

Another object of the present disclosure is to provide an apparatus and method for indicating two or more allocable analogue transmission beams in a wireless communication system.

Another object of the present disclosure is to provide an apparatus and method for allocating an analogue transmission beam other than a best analogue transmission beam in a wireless communication system.

According to an aspect of the present disclosure, an operation method of a receiving end in a wireless communication system includes: generating a signal indicating two or more analogue transmission beams which are allocable to the receiving end; and transmitting the signal.

According to another aspect of the present disclosure, an operation method of a transmitting end in a wireless communication system includes: receiving a signal indicating two or more analogue transmission beams which are allocable to a receiving end; and allocating an analogue transmission beam to the receiving end based on the signal.

According to another aspect of the present disclosure, a receiving end in a wireless communication system includes: a controller for generating a signal indicating two or more analogue transmission beams which are allocable to the receiving end; and a transmission unit for transmitting the signal.

According to another aspect of the present disclosure, a transmitting end in a wireless communication system includes: a reception unit for receiving a signal indicating two or more analogue transmission beams which are allocable to a receiving end; and a controller allocating an analogue transmission beam to the receiving end based on the signal.

In a wireless communication system, preferred beam information is acquired in various ways at a receiving end, so that a transmitting end can obtain a degree of freedom of adaptively allocating a beam to the receiving end. Accordingly, a load balance between beams as well as the degree of freedom can be achieved.

BRIEF DESCRIPTION OF THE DRAWINGS

FIG. 5 illustrates a view showing an example of interpretation of uplink signaling in a wireless communication system according to an exemplary embodiment of the present disclosure;

FIG. 7 illustrates a view showing an example of a configuration of bitmap in a wireless communication system according to an exemplary embodiment of the present disclosure;

DETAILED DESCRIPTION

Exemplary embodiments of the present disclosure will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

Hereinafter, technology for transmitting and receiving preferred beam information in a wireless communication system will be explained. In the following explanation, the term for expressing information for identifying beams and the term for configuring other preferred beam information will be used for convenience of explanation. Therefore, the present disclosure is not limited to the terms which will be described below, and other terms indicating objects having the same technical meaning may be used.

Figure 1:
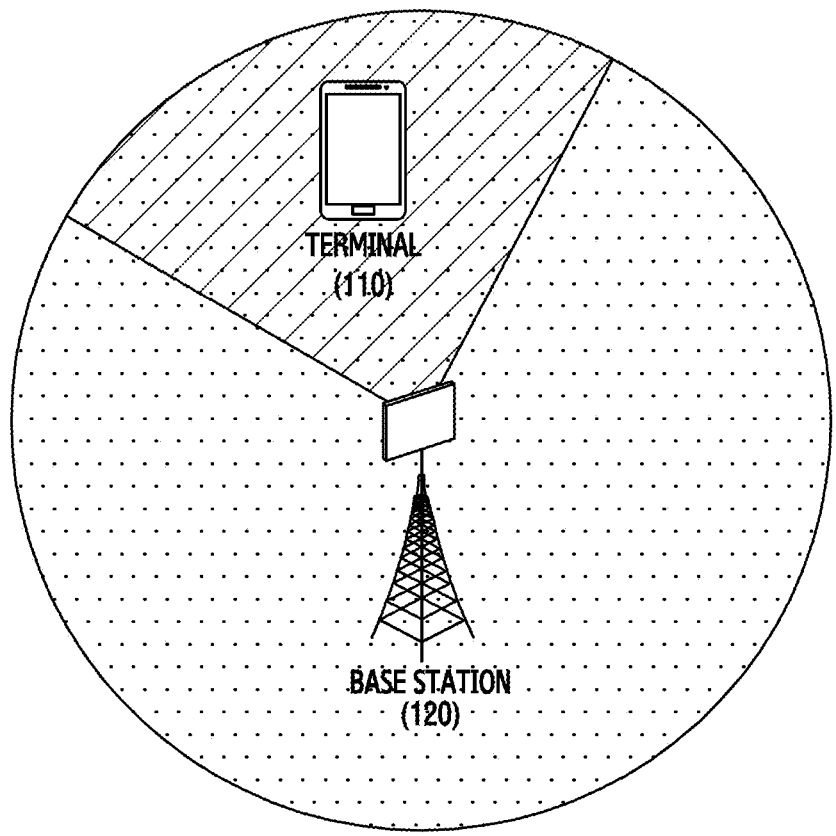
FIG. 1 illustrates a view showing a scheduling area according to whether beamforming is performed or not in a wireless communication system according to an exemplary embodiment of the present disclosure.
Figure 1:
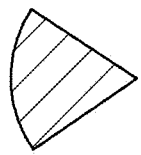
Figure 1:
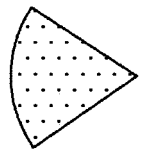

FIG. 1 illustrates a view showing a scheduling area according to whether beamforming is performed or not in a wireless communication system according to an exemplary embodiment of the present disclosure. FIG. 1 illustrates a scheduling-allowable area for a terminal 110 using a single beam when a base station 120 performs beamforming, that is, the base station 120 transmits signals using directional beams, and a scheduling-allowable area for the terminal 110 when the base station 120 does not perform beamforming, that is, the base station 120 transmits signals using omnidirectional beams.

When the beamforming is applied, the base station 120 and the terminal 110 should inform each other of their preferred analogue beam directions. Since the maximum number of beams that the base station 120 can transmit simultaneously is normally limited by hardware capability (for example, the number of radio frequency (RF) chains, etc.), there may be a limitation on user scheduling.

Referring to FIG. 1, when beamforming is not performed, the transmission signals of the base station 120 do not have directivity. Accordingly, the base station 120 can perform scheduling wherever the terminal 110 is located within a cell coverage. In other words, when beamforming is not performed, the base station 120 may perform user scheduling in all directions at every unit time.

On the other hand, when beamforming is performed, the transmission signals of the base station 120 have directivity corresponding to a selected beam. Accordingly, when the beamforming is performed, the base station 120 should perform scheduling with respect to users who are located in the direction of a limited number of analogue beams at every unit time. For example, when a single beam is considered, in order for the base station 120 to be able to perform scheduling with respect to the terminal 110, the terminal 110 should be located within a predetermined angle range with reference to the direction of the beam or should be located in an area that a reflected wave of the beam can reach if the direction of the beam is not considered. That is, when the beamforming is performed, the degree of freedom of scheduling may be reduced. As result, when usable beams are limited due to the number of connected terminals or geographical distribution, and the terminal 110 is not located in an area corresponding the direction of the usable beams, it may be difficult to perform scheduling with respect to the terminal 110.

When beamforming is performed for downlink communication, the base station may determine a best analogue beam for each array antenna, and furthermore, may determine a digital precoding vector to be applied to signals to be transmitted through a plurality of array antennas. For example, the analogue beam and the precoding vector may be selected by the terminal and may be fed back to the base station, and then may be used for scheduling in the base station. However, when digital beamforming is not performed, the precoding vector may not be determined.

The scheduling may be limited according to the number of usable beams of the base station and a frequency band. The limitation on the scheduling may cause problems such as a service delay, which is accompanied by calculation of scheduling of the base station in a region where there are many users. In addition, use of a superhigh frequency band may lead to problems that transmissivity of signals becomes lower than at a relatively lower frequency, and thus transmittance from an outdoor space to an indoor space is made difficult. Considering the communication environment such as the limitation on scheduling or degraded transmissivity, use of a repeater may be considered.

Figure 2:
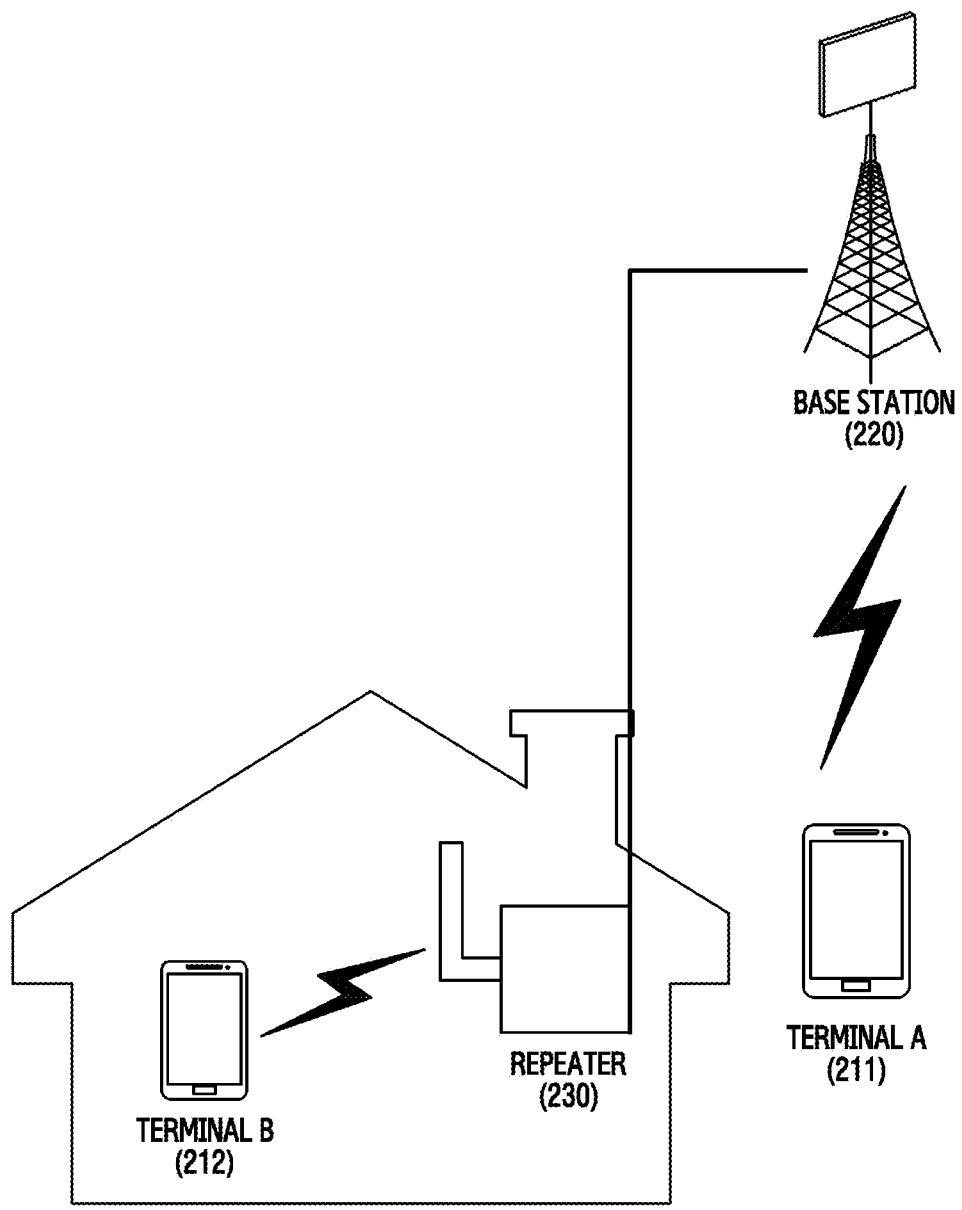
FIG. 2 illustrates a view showing examples of different wireless environments in a wireless communication system according to an exemplary embodiment of the present disclosure.

FIG. 2 illustrates a view showing examples of different wireless environments in a wireless communication system according to an exemplary embodiment. FIG. 2 illustrates two types of wireless environments. Referring to FIG. 2, a terminal A 211 is located in an outdoor area and a terminal B 212 is located in an indoor area. Channel modeling experiments conducted NYU (Prof. Rappaport) revealed that terminals in an outdoor area can normally communicate in any condition of Line of Sight (LOS) and Non-LOS (NLOS). Accordingly, the terminal A 211 transmits and receives radio signals to and from a base station 220. However, in the indoor area, a repeater 230, a Radio Remote Header (RRH), etc. may be used to overcome the low transmissivity of signals entering the indoor area as described above. In this case, the terminal B 212 may transmit and receive radio signals to and from the repeater 230. Since the repeater 230 is located in the indoor area, the repeater 230 does not need to increase a propagation distance through beamforming. Accordingly, the repeater 230 may have an omni-directional radiation property of radiating signals in all directions without beamforming.

That is, the terminals 211 and 212 may be located within a cell which transmits omni-directional signals or a cell which transmits directional signals according to circumstances. In other words, the terminals 211 and 212 may be in a wireless environment in which beamforming is performed or a wireless environment in which beamforming is not performed. In addition, when beamforming is performed, the wireless environment may be divided according to a beam width used in a transmitting end. In the case of FIG. 2, the outdoor area is illustrated as a wireless environment in which beamforming is performed and the indoor area is illustrated as a wireless environment in which beamforming is not performed. However, the indoor area and the outdoor area, which are considered in the present disclosure, are not always related to whether beamforming is performed or not as shown in FIG. 2. Accordingly, a wireless environment in which beamforming is not performed may be established in the outdoor area or a wireless environment in which beamforming is performed may be established in the indoor area.

Figure 3:
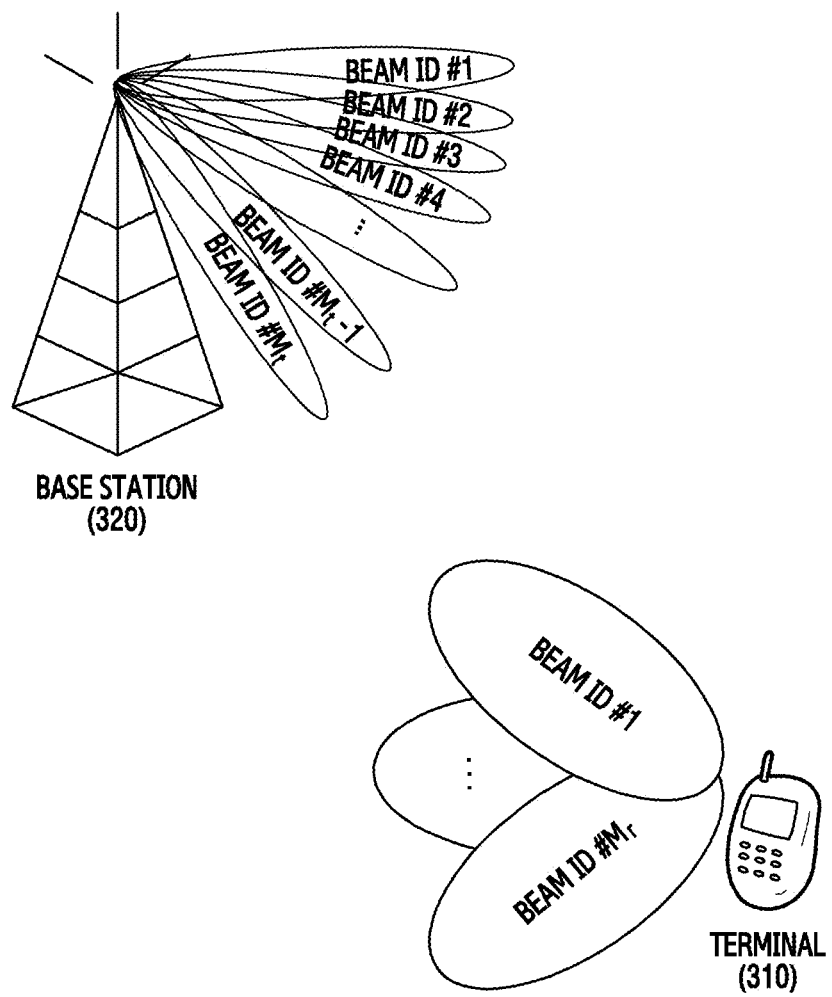
FIG. 3 illustrates a view showing examples of transmission beams and reception beams in a wireless communication system according to an exemplary embodiment of the present disclosure.

FIG. 3 illustrates a view showing examples of transmission beams and reception beams in a wireless communication system according to an exemplary embodiment of the present disclosure.

Referring to FIG. 3, a base station 320 uses beams #1 to # $M_t$ in different directions, and a terminal 310 uses beams #1 to # $M_r$ in different directions. The beams illustrated in FIG. 3 refer to one of the transmission beams and the reception beams or both the transmission beams and the reception beams. In the case of downlink communication, the base station 320 transmits signals to the terminal 310 using at least one of the beams #1 to # $M_t$ In this case, the base station 320 determines beams preferred by the terminal 310.

To achieve this, the base station 320 may transmit training signals using beams #1 to # $M_t$ and the terminal 310 may measure channel qualities regarding the training signals and select a best transmission beam. The channel quality may include at least one of Received Signal Strength (RSS) and channel capacity of reception signals. Herein, the training signal may be referred to as a reference signals, a preamble, a midamble, a pilot, etc. Furthermore, when the terminal 310 performs beamforming for reception, the terminal 310 may receive signals using the beams #1 to $M_r$ with respect to the respective beams from the base station 320, measure the channel qualitiesy of the signals, and then select a best reception beam. Thereafter, the terminal 310 may inform the base station 320 of its preferred transmission beam or reception beam by feeding the selected transmission beam or reception beam back to the base station 320.

In the case of FIG. 3, the beams of the terminal 310 have sequential identifiers (IDs) in the counter clockwise direction, and the beams of the base station 320 have sequential IDs in the clockwise direction. However, according to another exemplary embodiment of the present disclosure, the IDs of the beams may be allocated in other ways, and furthermore, may not be sequential in a specific direction.

Figure 4:
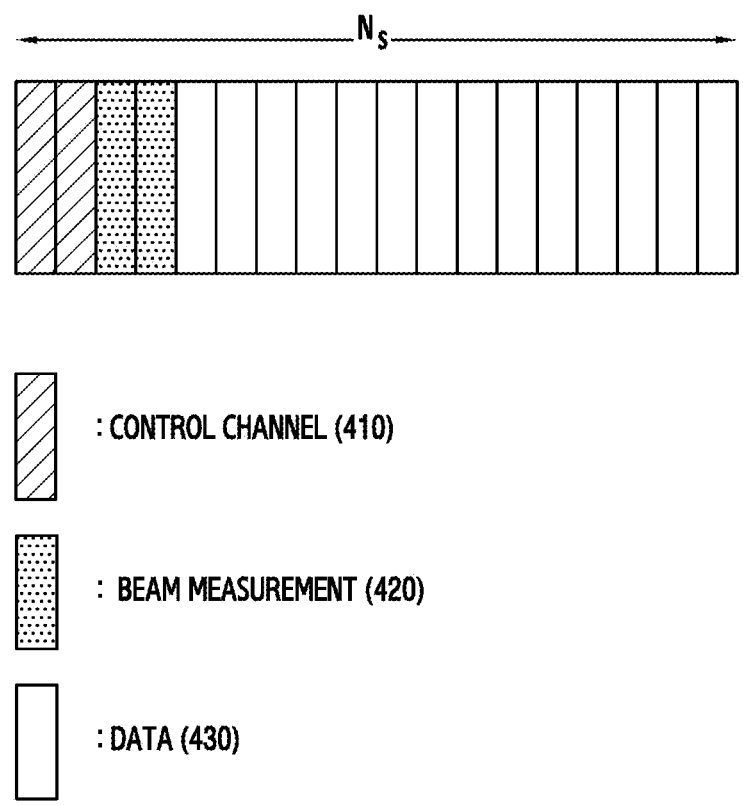
FIG. 4 illustrates a view showing a frame structure in a wireless communication system according to an exemplary embodiment of the present disclosure.

FIG. 4 illustrates a view showing a frame structure in a wireless communication system according to an exemplary embodiment of the present disclosure.

Referring to FIG. 4, the frame includes $N_s$ slots, and is divided into control channels 410 to relay control information to a user, beam measurement slots 420 to transmit Beam Measurement Reference Signals (BM RSs), and data slots 430 to relay traffic to the user. One slot is formed of as many Orthogonal Frequency Division Multiplexing (OFDM) symbols as $N_{symb}$. A base station performs beamforming with a specific analogue beam during a single OFDM symbol period in the beam measurement slots 420 to transmit the beam measurement reference signals in the direction of the analogue beam. A terminal may receive the beam measurement reference signals through the beam measurement slots 420 during a time when combinations of all beams are available, and may select a best beam based on measured channel quality information. Herein, the analogue beam may be identified by a beam ID.

As described above, a receiving end selects a preferred beam and transmits information (for example, a beam ID) indicating the selected beam to a transmitting end. In this case, when the transmitting end uses omni-directional beams, in other words, when the transmitting end is placed in a wireless environment in which beamforming is not performed, a plurality of beams may be selected. In addition, a plurality of beams may be selected due to the location of the receiving end, influence of reflected waves, etc. even when the transmitting end performs beamforming. For example, when the receiving end is located at the center of a cell, there may exist a plurality of beams having a best channel quality.

When a plurality of beams have a high channel quality, that is, when the receiving end selects the plurality of beams, the receiving end may transmit measurement information on the plurality of beams, so that the degree of freedom of scheduling can be enhanced in comparison with a case in which a single selected beam is informed. Hereinafter, the 'measurement information on the plurality of beams' will be referred to as 'beam measurement information' for convenience of explanation. That is, the beam measurement information indicates that analogue beams can be arbitrarily allocated. In particular, according to an exemplary embodiment of the present disclosure, the beam measurement information indicates two or more allocable analogue beams. The range of the arbitrarily allocable analogue beams may vary according a specific format of the beam measurement information. For example, the beam measurement information may be configured from the perspective of the entire beams or individual beams.

Uplink signaling related to a preferred beam according to an exemplary embodiment of the present disclosure may include an item as shown in table 1 presented below:

TABLE 1

| | Number of Bits | |
| --- | --- | --- |
| | Variable | 1 |
| Items | Best beam ID | SBQI (Similar Beam Quality Indicator) |

In table 1, the 'best beam ID' is a beam which is selected based on measurement using beam measurement reference signals, and indicates a beam having a best channel quality. The 'SBQI' is beam measurement information indicating channel quality information regarding all of the beams, and may be formed of 1 bit and indicate whether a beam other than the beam having the best channel quality is allowed to be allocated or not. The number of bits of the 'best beam ID' field may vary according to the number of analogue beams used in the system. As shown in table 1, the number of bits of the 'SBQI' field may be two or more. Although not shown in table 1, the uplink signaling may further include at least one of a Hybrid Automatic Repeat reQuest (HARQ) ACKnolwedge/Non-ACK (ACK/NACK), a Precoding Matrix Index (PMI), a Rank Indicator (RI), and a Channel Quality Indicator (CQI).

When the 'SBQI' is set to a positive value (for example, 1), any beams can be allocated at the transmitting end, and, when the 'SBQI' is set to a negative value (for example, 0), a specific analogue beam is required to be allocated. That is, the SBQI which is set to the positive value informs that signals can be transmitted to the receiving end with a beam other than the beam indicated by the best beam ID. Herein, allowing the allocation of other beams may mean that the channel qualities of the corresponding beams guarantee a minimum service quality. Accordingly, the transmitting end may allocate a beam other than the beam indicated by the best beam ID to the receiving end. In other words, the transmitting end can acquire the degree of freedom of scheduling for the receiving end.

In order to determine the value of the 'SBQI,' the receiving end may determine whether each beam satisfies a predetermined condition or not. When all of the beams satisfy the predetermined condition, the 'SBQI' is set to a positive value. In this case, the receiving end determines with reference to the transmission beams. The reception beams are not required to be allocated to the transmitting end, and may be arbitrarily selected by the receiving end. That is, the receiving end may use a best reception beam for a specific transmission beam. Accordingly, the receiving end may measure channel qualities regarding combinations of a single transmission beam with all of the reception beams, and then, when a combination with a certain reception beam satisfies a condition, may determine that the specific transmission beam satisfies the predetermined condition. That is, the 'SBQI' provides information on the transmission beams.

When both the 'best beam ID' and the 'SBQI' are transmitted as shown in table 1, overhead is further required as much as at least one bit due to the 'SBQI.' In order to prevent increasing overhead caused by 'SBQI,' a reserved value of a field indicating the 'best beam ID' may be used. For example, when 'best beam ID' is 4-bit information, a value which does not indicate a beam ID may be used as shown in FIG. 5.

FIG. 5 illustrates a view showing an example of interpretation of uplink signaling in a wireless communication system according to an exemplary embodiment. FIG. 5 illustrates a case in which the 'best beam ID' is formed of 4 bits and 10 beams are used. Referring to FIG. 5, values '0000' to '1001' which belong to a beam indication range 510 indicate beams which are selected by the receiving end. That is, values '1011' to '1111' from among the values expressed by 4 bits are not used to indicate beams. According to an exemplary embodiment of the present disclosure, values '1110' and '1111' which belong to an SBQI indication range 520 from among the values which do not indicate beams indicate similar information to the SBQI field of tables 1 and 2. For example, value '1110,' which is 'SBQI ON,' indicates that the SBQI is set to a positive value, in other words, indicates that the channel qualities of all of the beams are so good that communication is possible. In addition, value '1111,' which is 'SBQI OFF,' indicates that the SBQI is set to a negative value, that is, indicates that the channel quality of at least one beam is not so good that communication is possible. Herein, information indicating that communication is possible means that the channel quality exceeds a pre-defined threshold value.

When signals can be transmitted to the receiving end with a beam other than the beam indicated by the best beam ID, the significance of the existence of the best beam ID is reduced in comparison to the case in which the SBQI is set to a negative value. Accordingly, when the transmitting end does not transmit signals with a specific analogue beam, but transmits the SBQI indicating that communication is possible, the 'best beam ID' field may be omitted to reduce the overhead of the uplink signaling. For example, the uplink signaling related to the preferred beam may be configured as shown in table 2 presented below:

TABLE 2

| Number of Bits |
| --- |
| 1 |
| Item | SBQI (Similar Beam Quality Indicator) |

As shown in table 2, the 'best beam ID' is excluded and only the 'SBQI' is included. Although not expressed in table 2, the uplink signaling may further include at least one of HARQ ACK/NACK, a PMI, an RI, and CQI.

Figure 6:
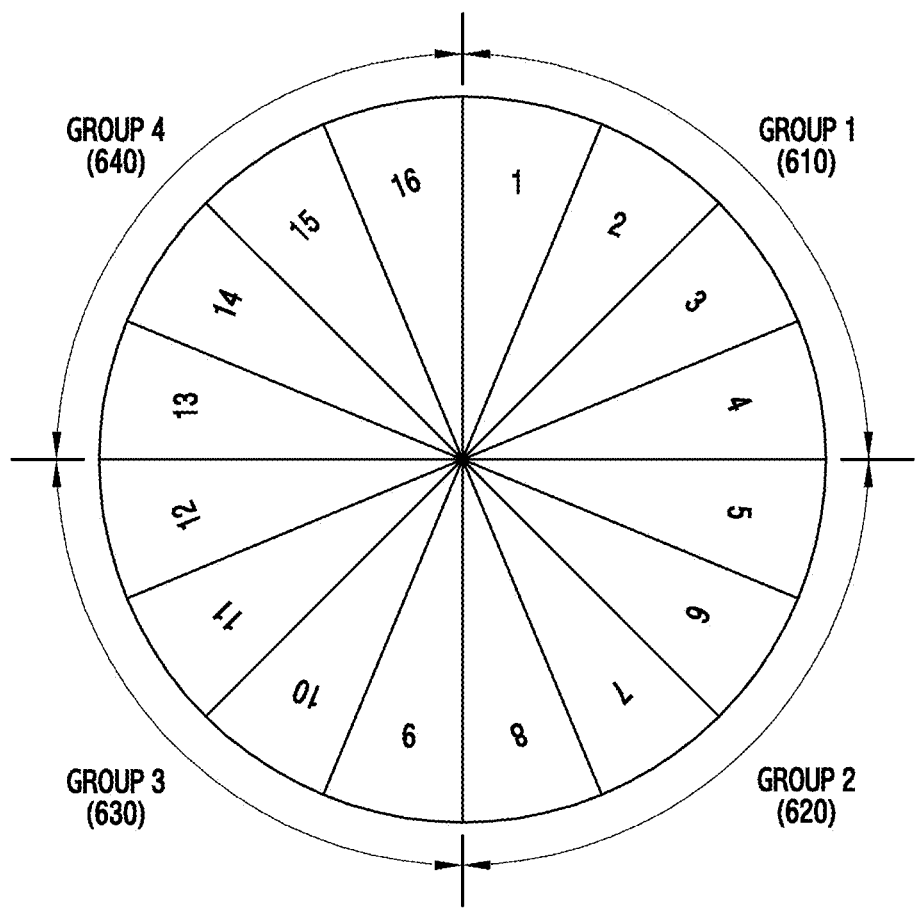
FIG. 6 illustrates a view showing an example of classified beam groups in a wireless communication system according to an exemplary embodiment of the present disclosure.

In the above-described exemplary embodiment, the beam measurement information (for example, SBQI) indicates whether all of the beams have channel qualities greater than or equal to a pre-defined threshold value or any one of the beams does not have a channel quality greater than or equal to the pre-defined threshold value. However, according to another exemplary embodiment of the present disclosure, the beam measurement information may be configured to provide more detailed information. For example, the beam measurement information provides information on a group basis. For example, when the transmitting end uses 16 transmission beams, four groups may be defined as shown in FIG. 6. FIG. 6 illustrates a view showing an example of classified beam groups in a wireless communication system according to an exemplary embodiment of the present disclosure. Referring to FIG. 6, the transmitting end may use 16 transmission beams, and four beams are grouped to a single group. That is, beams #1 to #4 are included in group 1 610, beams #5 to #8 are included in group 2 620, beams #9 to #12 are included in group 3 630, and beams #13 to #16 are included in group 4 640. In FIG. 6, physically adjacent beams are defined as one group. However, according to another exemplary embodiment of the present disclosure, beams which are not physically adjacent may be defined as one group.

The above-described definition of the group may be shared by the transmitting end and the receiving end. For example, the group may be pre-defined or may be forwarded through a broadcasting message of the transmitting end or a network entry process. Accordingly, the receiving end may measure channel qualities regarding the beams using the beam measurement reference signals, and transmit an index of a group in which all of the beams have channel qualities greater than or equal to a pre-defined threshold value as the beam measurement information. In other words, an index of a group including beams which have similar channel qualities may be forwarded as the beam measurement information. In this case, the uplink signaling may be configured as shown in table 3 presented below:

TABLE 3

| | Number of Bits | |
|---|---|---|
| | Variable | 2 |
| Items | Best Beam ID | SBQGI (Similar Beam Quality Group Indicator) |

In table 3, the 'best beam ID' indicates a beam having a best channel quality. The 'SBQGI,' which is beam measurement information, indicates a group including beams which have channel qualities greater than or equal to a threshold value. In the case of FIG. 3, the 'SBQGI' field is formed of 2 bits. The 'SBQGI' field of 2 bits is based on the premise that the number of beam groups is four or less. Accordingly, according to another exemplary embodiment of the present disclosure, when the number of beam groups is 5 or more, the 'SBQGI' field may be formed of 3 or more bits. Although not expressed in table 3, the uplink signaling may further include at least one of HARQ ACK/NACK, a PMI, an RI, and CQI.

Similarly in the case of table 2, the 'best beam ID' field may be omitted to reduce the overhead of the uplink signaling. For example, the uplink signaling related to the preferred beam may be configured as shown in table 4:

TABLE 4

| | Number of Bits |
|---|---|
| | 1 |
| Item | SBQGI (Similar Beam Quality Group Indicator) |

As shown in table 4, the 'best beam ID' is excluded and only the 'SBQGI' is included. Although not expressed in table 4, the uplink signaling may further include at least one of HARQ ACK/NACK, a PMI, an RI, and CQI.

According to another exemplary embodiment of the present disclosure, the beam measurement information may be configured to provide more detailed information. For example, the beam measurement information may indicate whether each of the beams has a channel quality greater than or equal to a threshold value or not. For example, when the transmitting end uses 16 transmission beams, the beam measurement information may be configured in the format of a bitmap as shown in FIG. 7.

FIG. 7 illustrates a view showing an example of a configuration of a bitmap in a wireless communication system according to an exemplary embodiment of the present disclosure. Referring to FIG. 7, the bitmap 710 includes 16 bits $b_0$ to $b_{15}$, and the bits correspond to the 16 beams of the transmitting end. The value of each of the bits indicates whether the channel quality of the corresponding beam is greater than or equal to a threshold value or not. For example, when $b_2$ corresponding to beam #3 is set to a positive value (for example, 1), the channel quality of beam #3 is greater than or equal to the threshold value. In this case, the transmitting end may allocate beam #3 to the receiving end.

The corresponding relationship between the bits in the bitmap and the beams may be shared by the transmitting end and the receiving end. For example, the corresponding relationship may be pre-defined or may be forwarded through a broadcasting message of the transmitting end or a network entry process. Accordingly, the receiving end may measure a channel quality regarding each of the beams using the beam measurement reference signals, set the value of each of the bits in the bitmap according to whether each of the beams has a channel quality greater than or equal to a pre-defined threshold value, and transmit the bitmap as the beam measurement information. As such, detailed beam measurement information on each of the beams may be forwarded. In this case, the uplink signaling may be configured as shown in table 5 presented below:

TABLE 5

| | Number of Bits | |
|---|---|---|
| | Variable | 16 |
| Items | Best Beam ID | SBQBI (Similar Beam Quality Bitmap Indicator) |

In table 5, the 'best beam ID' indicates a beam having a best channel quality. The 'SBQBI', which is beam measurement information, indicates a group including beams which have channel qualities greater than or equal to a threshold value. In the case of table 5, the 'SBQBI' field is formed of 16 bits. According to another exemplary embodiment of the present disclosure, when the number of beams is different, the number of bits of the 'SBQBI' field may be different. Although not expressed in table 5, the uplink signaling may further include at least one HARQ ACK/NACK, a PMI, an RI, and CQI.

Similarly in the case of table 2, the 'best beam ID' field may be omitted to reduce the overhead of the uplink signaling. For example, the uplink signaling related to the preferred beam may be configured as shown in table 6:

TABLE 6

| | Number of Bits 16 |
|---|---|
| Item | SBQBI (Similar Beam Quality Bitmap Indicator) |

As shown in table 6, the 'best beam ID' is excluded and only the 'SBQBI' is included. Although not expressed in table 6, the uplink signaling may further include at least one of HARQ ACK/NACK, a PMI, an RI, and a CQI.

Hereinafter, the operation and configuration of the receiving end and the transmitting end using the beam measurement information as described above will be explained.

Figure 8:
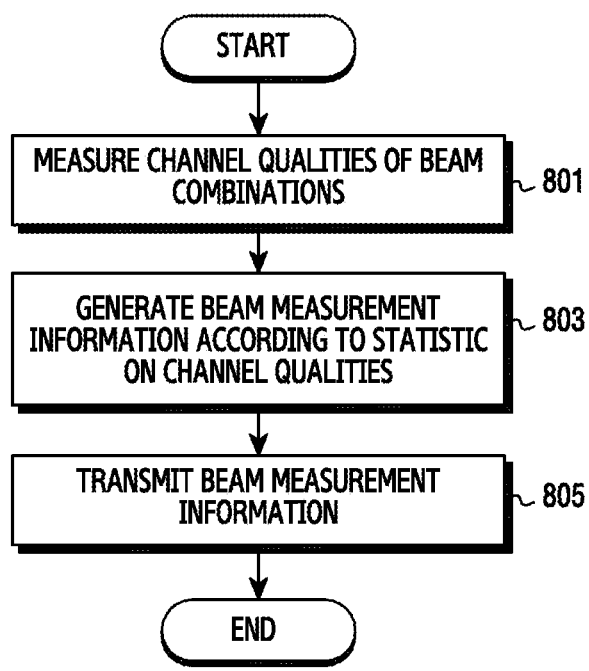
FIG. 8 illustrates a view showing an operation procedure of a receiving end in a wireless communication system according to an exemplary embodiment of the present disclosure.

FIG. 8 illustrates a view showing an operation procedure of a receiving end in a wireless communication system according to an exemplary embodiment of the present disclosure.

Referring to FIG. 8, the receiving end measures channel qualities of beam combinations in step 801. That is, the transmitting end supports a plurality of transmission beams, and the receiving end supports at least one reception beam. Accordingly, as many beam combinations as the number of transmission beams and the number of reception beams may be generated. The receiving end may receive reference signals which are beamformed for transmission with transmission beams by beamforming with reception beams, and measure channel qualities. The channel quality may include at least one of Received Signal Strength (RSS), a Signal to Interference and Noise Ratio (SINR), a Carrier to Interference and Noise Ratio (CINR), a Signal to Noise Ratio (SNR), and channel capacity.

After measuring the channel qualities, the receiving end proceeds to step 803 to generate beam measurement information according statistics on the channel qualities. The beam measurement information is measurement information regarding a plurality of beams as well as a best analogue beam, and indicates whether all transmission beams, a group of transmission beams, or an individual transmission beam is allowed to be arbitrarily allocated. For example, the beam measurement information may be configured like the above-described SBQI, SBQGI, or SBQBI. Herein, the statistics on the channel qualities may include at least one of information on whether channel qualities of all of the beams satisfy a predetermined criterion or not, similarity of the channel qualities of all of the beams, information on whether channel qualities of all of the beams of a group satisfy a predetermined criterion, similarity of the channel qualities of all of the beams of the group, information on whether a channel quality of each of the beams satisfies a predetermined criterion, and similarity of the channel qualities of the beams satisfying the predetermined criterion. That is, the beam measurement information may indicate at least one of whether the channel quality regarding all of the transmission beams, a group of transmission beams, or an individual transmission beam satisfies a predetermined criterion or not, and whether channel qualities are similar or not.

After generating the beam measurement information, the receiving end proceeds to step 805 to transmit the beam measurement information. The beam measurement information may have a format of a message. According to another exemplary embodiment, the beam measurement information may have a format of a physical sequence or a codeword. In this case, in addition to the beam measurement information, the receiving end may further transmit at least one of information indicating a best analogue beam, HARQ ACK/NACK, a PMI, an RI, and a CQI.

Figure 9:
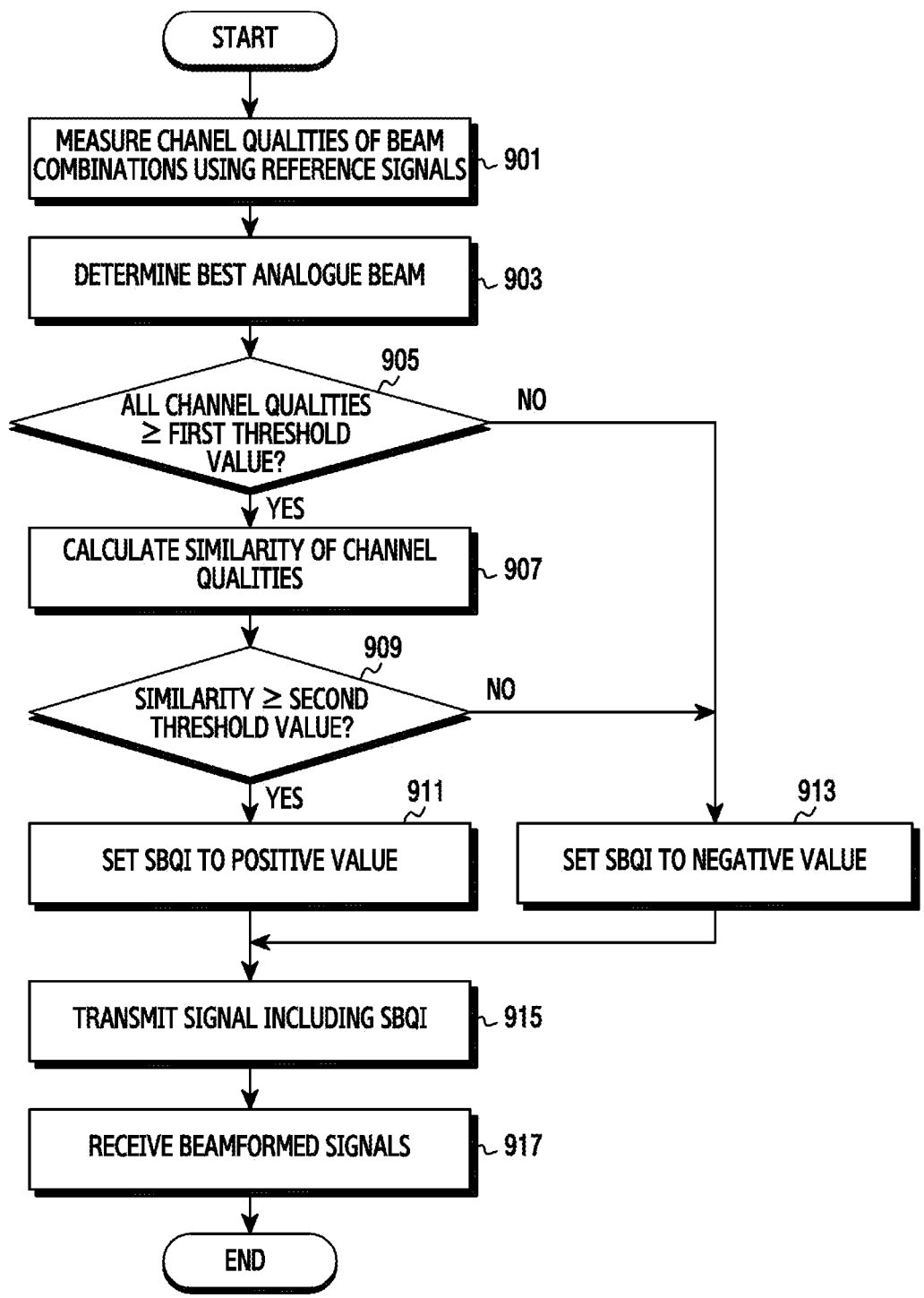
FIG. 9 illustrates a view showing an operation procedure of a receiving end in a wireless communication system according to another exemplary embodiment of the present disclosure.

FIG. 9 illustrates a view showing an operation procedure of the receiving end in the wireless communication system according to another exemplary embodiment of the present disclosure.

Referring to FIG. 9, the receiving end measures a channel quality for each beam combination using reference signals for beam measurement which are received from the transmitting end in step 901. The reference signals may be received through OFDM symbols. Accordingly, the receiving end may receive the reference signals transmitted through the OFDM symbols and measure as many times as the total number of analogue beam combinations, and store the result of the measurement. Herein, the beam combinations may refer to pairs of transmission beams and reception beams.

After measuring the channel quality for each of the beam combinations using the reference signals, the receiving end proceeds to step 903 to determine a best analogue beam based on the measured channel quality. In this case, the receiving end may further determine a best precoder for digital beamforming. That is, the receiving end may determine a beam combination having the best channel quality by comparing the channel qualities of the beam combinations. Herein, the channel quality may include received signal strength.

Next, the receiving end proceeds to step 905 to determine whether the channel qualities of all of the beams satisfy a predetermined condition, that is, whether the channel qualities are greater than or equal to a first threshold value or not. Herein, all of the beams refer to transmission beams. That is, the transmission beams and the reception beams have a one-to-many relationship, but, when the predetermined condition is satisfied in a combination with at least one reception beam, the receiving end determines that the corresponding transmission beams satisfy the predetermined condition. The first threshold value may be defined differently according to various exemplary embodiments. For example, the first threshold value may be a threshold value of a channel quality (for example, received signal strength, an SINR, a CINR, an SNR, channel capacity, etc.) for guaranteeing a minimum service quality. When at least one of the channel qualities of all of the beams is less than the first threshold value, the receiving end proceeds to step 913.

On the other hand, when the channel qualities of all of the beams are greater than or equal to the first threshold value, the receiving end proceeds to step 907 to calculate the similarity of the channel qualities of all of the beam combinations. For example, the receiving end calculates a variance of the channel qualities. For example, when the channel quality is received signal strength, the receiving end may calculate statistics regarding how far the received signal strengths of the beam combinations are spread out.

After calculating the similarity, the receiving end proceeds to step 909 to determine whether the similarity satisfies a predetermined condition or not, in other words, whether the similarity is greater than or equal to a second threshold value. For example, when the similarity is evaluated based on a variance, and the variance is less than or equal to a specific threshold value, the similarity is determined to be greater than or equal to the second threshold value. Since a high variance indicates that the channel qualities are very spread out, a small variance indicates that the channel qualities are similar.

When the similarity satisfies the predetermined condition, the receiving end proceeds to step 911 to set the SBQI to a positive value (for example, 1). The SBQI, which is beam measurement information formed of 1 bit, indicates whether a beam other than the beam having the best channel quality is allowed to be allocated or not. That is, the receiving end sets the SBQI to a value indicating that all of the beams are allowed to be allocated. According to another exemplary embodiment, the SBQI may be included in a field for forwarding other information. For example, when the SBQI is indicated through a field indicating a best analogue beam, the receiving end may set the field to a value which is defined for the SBQI set to the positive value, in addition to a value indicating a specific analogue beam.

On the other hand, when the similarity does not satisfy the predetermined condition, the receiving end proceeds to step 913 to set the SBQI to a negative value (for example, 0). That is, the receiving end sets the SBQI to a value indicating that a specific transmission beam should be allocated. According to another exemplary embodiment of the present disclosure, the SBQI may be included in a field for forwarding other information. For example, when the SBQI is indicated through a field indicating a best analogue beam, the receiving end may set the field to a value which is defined for the SBQI set to the negative value, in addition to a value indicating a specific analogue beam.

Thereafter, the receiving end proceeds to step 915 to transmit a signal including the SBQI. The signal including the SBQI may have a format of a message, a physical sequence, or a codeword. In addition, the receiving end may further transmit at least one of information indicating a best analogue beam, HARQ ACK/NACK, a PMI, an RI, and a CQI, in addition to the SBQI.

Thereafter, the receiving end proceeds to step 917 to receive beamformed signals from the transmitting end. When the SBQI is set to a negative value, the receiving end may receive the beamformed signals using the best analogue beam or the analogue beam which is determined by the transmitting end (for example, a base station). When the SBQI is set to a positive value, the receiving end may receive the beamformed signals using the best analogue beam at the base station or the analogue beam which is determined by the transmitting end. In this case, the receiving end may perform beamforming for reception using the reception beams corresponding to the transmission beams which are used for beamforming at the transmitting end.

Figure 10:
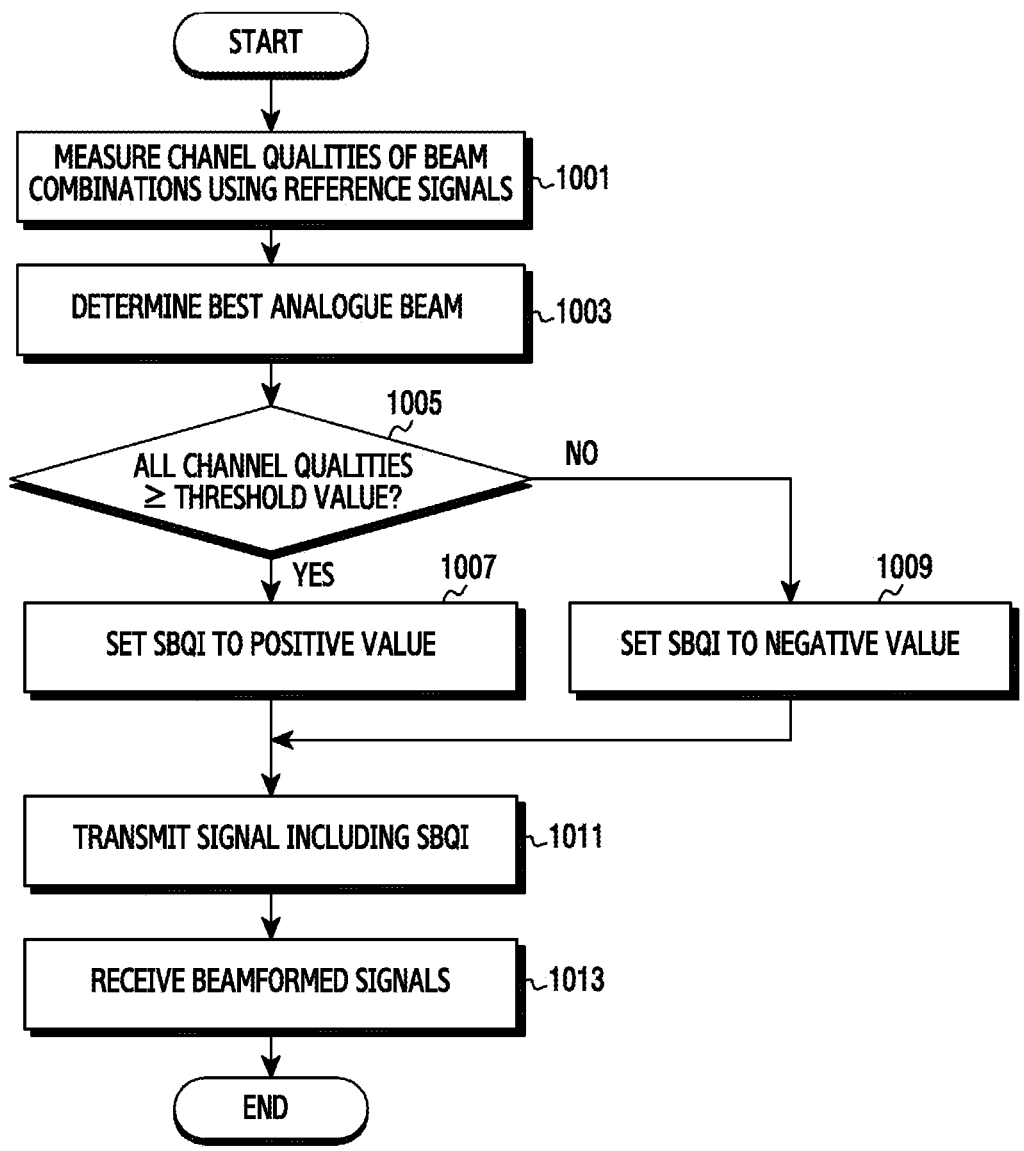
FIG. 10 illustrates a view showing an operation procedure of a receiving end in a wireless communication system according to another exemplary embodiment of the present disclosure.

FIG. 10 illustrates a view showing an operation procedure of the receiving end in the wireless communication system according to another exemplary embodiment of the present disclosure.

Referring to FIG. 10, the receiving end measures a channel quality for each beam combination using reference signals for beam measurement which are received from the transmitting end in step 1001. The reference signals may be received through OFDM symbols. Accordingly, the receiving end may receive the reference signals transmitted through the OFDM symbols and measure as many times as the total number of analogue beam combinations, and store the result of the measurement. Herein, the beam combinations may refer to pairs of transmission beams and reception beams.

After measuring the channel quality for each of the beam combinations using the reference signals, the receiving end proceeds to step 1003 to determine a best analogue beam based on the measured channel quality. In this case, the receiving end may further determine a best precoder for digital beamforming. That is, the receiving end may determine a beam combination having the best channel quality by comparing the channel qualities of the beam combinations. Herein, the channel quality may include received signal strength.

Next, the receiving end proceeds to step 1005 to determine whether the channel qualities of all of the beams satisfy a predetermined condition, that is, whether the channel qualities are greater than or equal to a threshold value or not. Herein, all of the beams refer to transmission beams. That is, the transmission beams and the reception beams have a one-to-many relationship, but, when the predetermined condition is satisfied in a combination with at least one reception beam, the receiving end determines that the corresponding transmission beams satisfy the predetermined condition. The threshold value may be defined differently according to various exemplary embodiments. For example, the threshold value may be a threshold value of a channel quality (for example, received signal strength, an SINR, a CINR, an SNR, channel capacity, etc.) for guaranteeing a minimum service quality.

When the channel qualities of all of the beams are greater than or equal to the threshold value, the receiving end proceeds to step 1007 to set the SBQI to a positive value (for example, 1). The SBQI, which is beam measurement information formed of 1 bit, indicates whether a beam other than the beam having the best channel quality is allowed to be allocated or not. That is, the receiving end sets the SBQI to a value indicating that all of the beams are allowed to be allocated. According to another exemplary embodiment, the SBQI may be included in a field for forwarding other information. For example, when the SBQI is indicated through a field indicating a best analogue beam, the receiving end may set the field to a value which is defined for the SBQI set to the positive value, in addition to a value indicating a specific analogue beam.

On the other hand, when the channel quality of at least one beam is less than the threshold value, the receiving end proceeds to step 1009 to set the SBQI to a negative value (for example, 0). That is, the receiving end sets the SBQI to a value indicating that a specific transmission beam should be allocated. According to another exemplary embodiment of the present disclosure, the SBQI may be included in a field for forwarding other information. For example, when the SBQI is indicated through a field indicating a best analogue beam, the receiving end may set the field to a value which is defined for the SBQI set to the negative value, in addition to a value indicating a specific analogue beam.

Thereafter, the receiving end proceeds to step 1011 to transmit a signal including the SBQI. The signal including the SBQI may have a format of a message. According to another exemplary embodiment of the present disclosure, the message including the SBQI may have a format of a physical sequence or a codeword. In this case, the receiving end may further transmit information indicating the best analogue beam in addition to the SBQI. The best analogue beam may be indicated by a beam ID. Furthermore, the receiving end may further transmit at least one of HARQ ACK/NACK, a PMI, an RI, and a CQI.

Thereafter, the receiving end proceeds to step 1013 to receive beamformed signals from the transmitting end. When the SBQI is set to a negative value, the receiving end may receive the beamformed signals using the best analogue beam. When the SBQI is set to a positive value, the receiving end may receive the beamformed signals using the best analogue beam at the base station or the analogue beam which is determined by the transmitting end. In this case, the receiving end may perform beamforming for reception using the reception beams corresponding to the transmission beams which are used for beamforming at the transmitting end.

Figure 11:
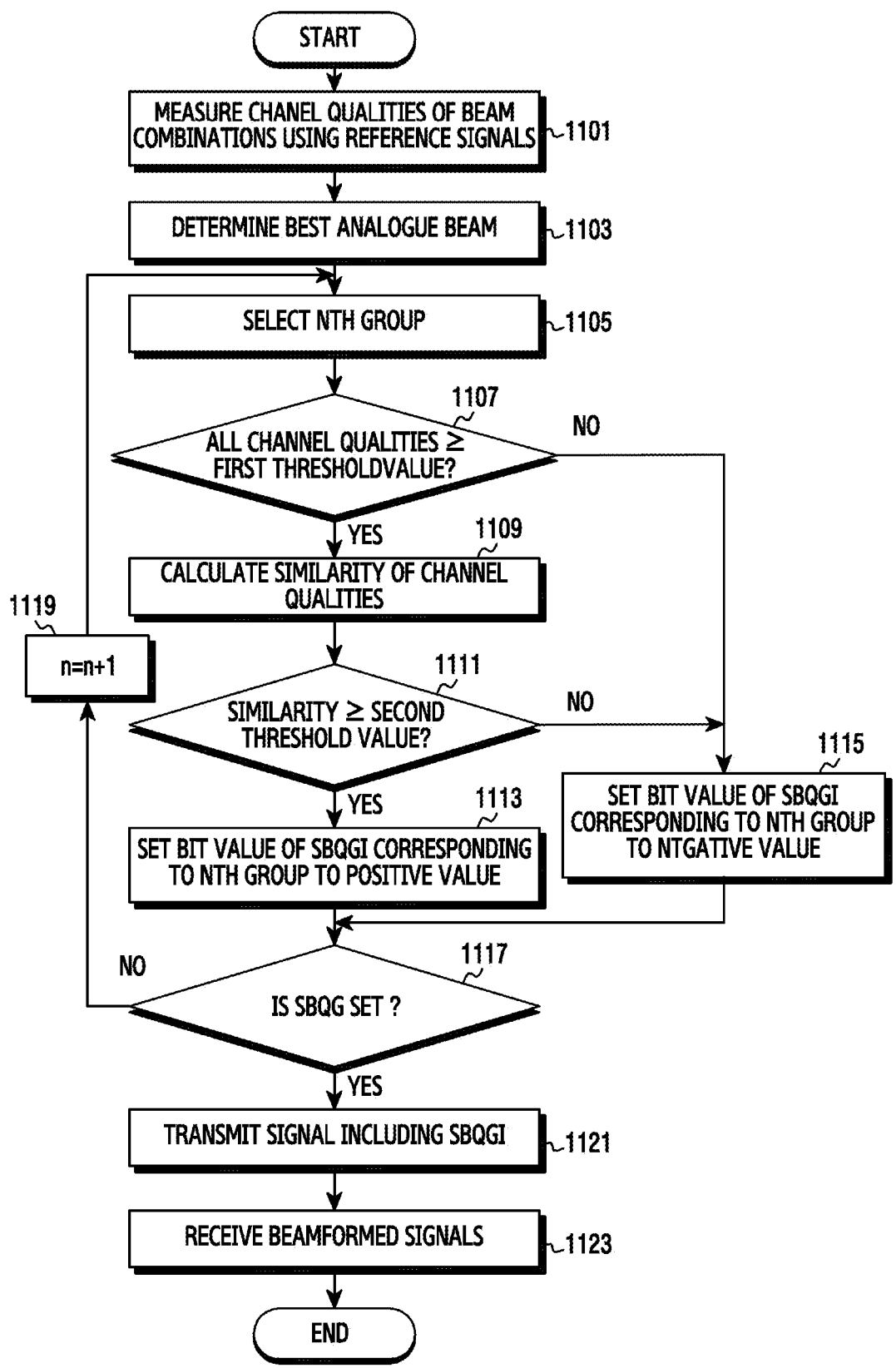
FIG. 11 illustrates a view showing an operation procedure of a receiving end in a wireless communication system according to another exemplary embodiment of the present disclosure.

FIG. 11 illustrates a view showing an operation procedure of the receiving end in the wireless communication system according to another exemplary embodiment of the present disclosure.

Referring to FIG. 11, the receiving end measures a channel quality for each beam combination using reference signals for beam measurement which are received from the transmitting end in step 1101. The reference signals may be received through OFDM symbols. Accordingly, the receiving end may receive the reference signals transmitted through the OFDM symbols and measure as many times as the total number of analogue beam combinations, and store the result of the measurement. Herein, the beam combinations may refer to pairs of transmission beams and reception beams.

After measuring the channel quality for each of the beam combinations using the reference signals, the receiving end proceeds to step 1103 to select a best analogue beam based on the measured channel quality. In this case, the receiving end may further select a best precoder for digital beamforming. That is, the receiving end may select a beam combination having the best channel quality by comparing the channel qualities of the beam combinations. Herein, the channel quality may include received signal strength.

Next, the receiving end proceeds to step 1105 to select an nth group. The groups are generated by classifying the transmission beams of the transmitting end, and each of the groups includes a plurality of transmission beams. The groups may be classified in different ways according to various exemplary embodiments of the present disclosure. The n is initialized to 1 at the start of the present procedure and sequentially increases. Accordingly, steps 1107 to 1117 may be repeated with respect to each of the groups.

Thereafter, the receiving end proceeds to step 1107 to determine whether the channel qualities of all of the beams included in the nth group satisfy a predetermined condition, that is, whether the channel qualities are greater than or equal to a first threshold value. Herein, all of the beams refer to transmission beams. That is, the transmission beams and the reception beams have a one-to-many relationship, but, when the predetermined condition is satisfied in a combination with at least one reception beam, the receiving end determines that the corresponding transmission beams satisfy the predetermined condition. The first threshold value may be defined differently according to various exemplary embodiments. For example, the first threshold value may be a threshold value of a channel quality (for example, received signal strength, an SINR, a CINR, an SNR, channel capacity, etc.) for guaranteeing a minimum service quality. When at least one of the channel qualities of all of the beams included in the nth group is less than the first threshold value, the receiving end proceeds to step 1115.

On the other hand, when the channel qualities of all of the beams included in the nth group are greater than or equal to the first threshold value, the receiving end proceeds to step 1109 to calculate the similarity of the channel qualities of all of the beam combinations included in the nth group. For example, the receiving end calculates a variance of the channel qualities. For example, when the channel quality is received signal strength, the receiving end may calculate statistics regarding how far the received signal strengths of the beam combinations are spread out.

After calculating the similarity, the receiving end proceeds to step 1111 to determine whether the similarity satisfies a predetermined condition or not, in other words, whether the similarity is greater than or equal to a second threshold value. For example, when the similarity is evaluated based on a variance, and the variance is less than or equal to a specific threshold value, the similarity is determined to be greater than or equal to the second threshold value. Since a high variance indicates that the channel qualities are very spread out, a small variance indicates that the channel qualities are similar.

When the similarity satisfies the predetermined condition, the receiving end proceeds to step 1113 to set a bit value of an SBQGI corresponding to the nth group to a positive value (for example, 1). The SBQGI, which is beam measurement information formed on a group basis, indicates whether a beam other than the beam having the best channel quality in the corresponding group is allowed to be allocated or not. That is, the receiving end sets the bit value to a value indicating that all of the beams included in the corresponding group are allowed to be allocated.

On the other hand, when the similarity does not satisfy the predetermined condition, the receiving end proceeds to step 1115 to set the bit value of the SBQGI corresponding to the nth group to a negative value (for example, 0). That is, the receiving end sets the SBQGI to a value indicating that the beams included in the corresponding group are not allowed to be allocated arbitrarily.

Next, the receiving end proceeds to step 1117 to determine whether the setting of the SBQGI is completed or not. In other words, the receiving end determines whether all of the bit values of the SBQGI are set. That is, the receiving end determines whether steps 1107 to 1115 are performed with respect to all of the groups.

When the setting of the SBQGI is not completed, the receiving end proceeds to step 1119 to increase n by 1 and then returns to step 1105. Accordingly, steps 1107 to 1115 are repeated with respect to the next groups.

On the other hand, when the setting of the SBQGI is completed, the receiving end proceeds to step 1121 to transmit a signal including the SBQGI. The signal including the SBQGI may have a format of a message. According to another exemplary embodiment of the present disclosure, the message including the SBQGI may have a format of a physical sequence or a codeword. In this case, the receiving end may further transmit information indicating a best analogue beam in addition to the SBQGI. The best analogue beam may be indicated by a beam ID. Furthermore, the receiving end may further transmit at least one of HARQ ACK/NACK, a PMI, an RI, and a CQI.

Thereafter, the receiving end proceeds to step 1123 to receive beamformed signals from the transmitting end. When all of the bits of the SBQGI are set to a negative value, the receiving end may receive the beamformed signals using the best analogue beam. When at least one bit of the SBQGI is set to a positive value, the receiving end may receive the beamformed signals using the best analogue beam at the base station or the analogue beam which is selected by the transmitting end in the group corresponding to the positive value. In this case, the receiving end may perform beamforming for reception using the reception beams corresponding to the transmission beams which are used for beamforming at the transmitting end.

In the exemplary embodiment illustrated in FIG. 11, the receiving end sets the bit value corresponding to the corresponding group to a positive value when the receiving end satisfies a first condition in which the channel qualities are greater than or equal to the first threshold value and a second condition in which the similarity of the channel qualities is greater than or equal to the second threshold value.

However, according to another exemplary embodiment of the present disclosure, when one of the first condition and the second condition is satisfied, the bit value corresponding to the corresponding group may be set to a positive value. In this case, when the channel qualities of all of the beams included in the nth group are greater than or equal to the first threshold value in step 1107, the receiving end may proceed to step 1113. In addition, when at least one of the channel qualities of all of the beams included in the nth group is less than the first threshold value, the receiving end may proceed to step 1109.

In addition, according to another exemplary embodiment of the present disclosure, the bit value corresponding to the corresponding group may be set according to only the first condition. In this case, when the channel qualities of all of the beams included in the nth group are greater than or equal to the first threshold value in step 1107, the receiving end may proceed to step 1113. In addition, when at least one of the channel qualities of all of the beams included in the nth group is less than the first threshold value, the receiving end may proceed to step 1115. That is, steps 1109 to 1111 may be omitted.

In addition, according to another exemplary embodiment of the present disclosure, the bit value corresponding to the corresponding group may be set according to only the second condition. In this case, step 1107 may be omitted.

Figure 12:
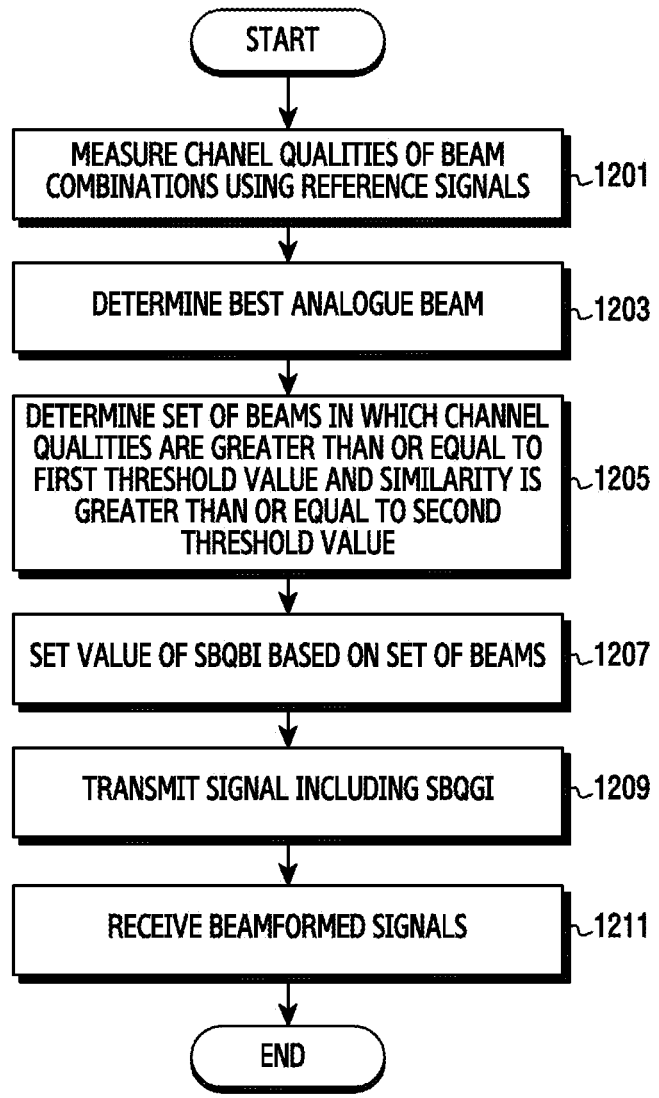
FIG. 12 illustrates a view showing an operation procedure of a receiving end in a wireless communication system according to another exemplary embodiment of the present disclosure.

FIG. 12 illustrates a view showing an operation procedure of the receiving end in the wireless communication system according to another exemplary embodiment of the present disclosure.

Referring to FIG. 12, the receiving end measures a channel quality for each beam combination using reference signals for beam measurement which are received from the transmitting end in step 1201. The reference signals may be received through OFDM symbols. Accordingly, the receiving end may receive the reference signals transmitted through the OFDM symbols and measure as many times as the total number of analogue beam combinations, and store the result of the measurement. Herein, the beam combinations may refer to pairs of transmission beams and reception beams.

After measuring the channel quality for each of the beam combinations using the reference signals, the receiving end proceeds to step 1203 to determine a best analogue beam based on the measured channel quality. In this case, the receiving end may further determine a best precoder for digital beamforming. That is, the receiving end may determine a beam combination having the best channel quality by comparing the channel qualities of the beam combinations. Herein, the channel quality may include received signal strength.

Next, the receiving end proceeds to step 1205 to determine, from among all of the beams, a set of beams in which channel qualities are greater than or equal to a first threshold value and simultaneously similarity of the channel qualities is greater than or equal to a second threshold value. The first threshold value may be defined differently according to various exemplary embodiments. For example, the first threshold value may be a threshold value of a channel quality (for example, received signal strength, an SINR, a CINR, an SNR, channel capacity, etc.) for guaranteeing a minimum service quality. In addition, the similarity may be expressed using a variance of the channel qualities. When the similarity is evaluated based on the variance, and the variance is less than or equal to a specific threshold value, the similarity is determined to be greater than or equal to the second threshold value.

After determining the set of beams, the receiving end proceeds to step 1207 to set a value of an SBQBI based on the set of beams. The SBQBI, which is individual beam measurement information for each of the transmission beams, indicates whether each of the transmission beams is allowed to be allocated. That is, the receiving end may set bit values corresponding to the beams belonging to the set of beams to a positive value (for example, 1), and set the other bit values to a negative value (for example, 2).

Thereafter, the receiving end proceeds to step 1209 to transmit a signal including the SBQBI. The signal including the SBQBI may have a format of a message. According to another exemplary embodiment of the present disclosure, the message including the SBQBI may have a format of a physical sequence or a codeword. In this case, the receiving end may further transmit information indicating a best analogue beam in addition to the SBQBI. The best analogue beam may be indicated by a beam ID. Furthermore, the receiving end may further transmit at least one of HARQ ACK'NACK, a PMI, an RI, and a CQI.

Thereafter, the receiving end proceeds to step 1211 to receive beamformed signals from the transmitting end. When the SBQBI is set to a negative value, the receiving end may receive the beamformed signals using the best analogue beam. When the SBQBI is set to a positive value, the receiving end may receive the beamformed signals using the best analogue beam at the base station or the analogue beam which is determined by the transmitting end. In this case, the receiving end may perform beamforming for reception using the reception beams corresponding to the transmission beams which are used for beamforming at the transmitting end.

In the exemplary embodiment illustrated in FIG. 12, the receiving end determines a set of beams satisfying a first condition in which the channel qualities are greater than or equal to the first threshold value and a second condition in which the similarity of the channel qualities is greater than or equal to the second threshold value.

However, according to another exemplary embodiment of the present disclosure, when one of the first condition and the second condition is satisfied, the set of beams may be determined. In this case, in step 1205, the receiving end may determine beams satisfying at least one of the first condition and the second condition as the set of beams to set the SBQBI to a positive value.

In addition, according to another exemplary embodiment of the present disclosure, the set of beams may be determined according to only the first condition or the second condition. In this case, in step 1205, the receiving end may determine beams satisfying the first condition as the set of beams to set the SBQBI to a positive value or determine beams satisfying the second condition as the set of beams to set the SBQBI to a positive value.

Figure 13:
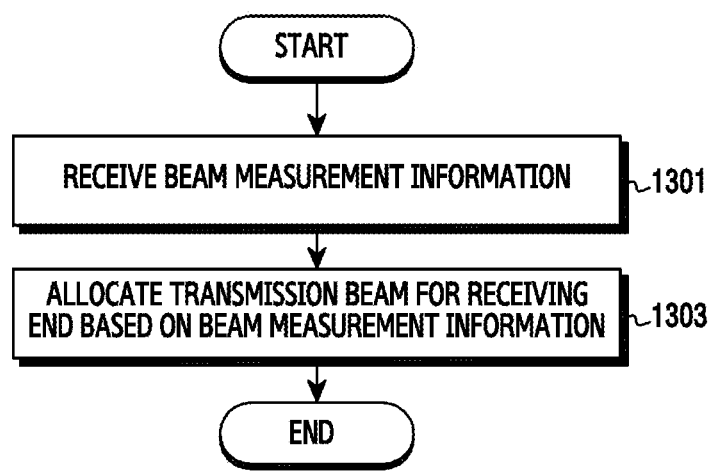
FIG. 13 illustrates a view showing an operation procedure of a transmitting end in a wireless communication system according to an exemplary embodiment of the present disclosure.

FIG. 13 illustrates a view showing an operation procedure of a transmitting end according to an exemplary embodiment of the present disclosure.

Referring to FIG. 13, the transmitting end receives beam measurement information in step 1301. The beam measurement information is measurement information regarding a plurality of beams as well as a best analogue beam, and indicates whether all transmission beams, a group of transmission beams, or an individual transmission beam is allowed to be arbitrarily allocated. For example, the beam measurement information may be configured like the above-described SBQI, SBQGI, or SBQBI. That is, the beam measurement information may indicate whether a channel quality of all of the transmission beams, a group of the transmission beams, or an individual transmission beam satisfies a predetermined criterion or not, and whether the channel qualities are similar or not.

After receiving the beam measurement information, the transmitting end proceeds to step 1303 to allocate an analogue transmission beam for the receiving end based on the beam measurement information. For example, when frequency and time resources are not scarce in a specific analogue beam, the beam measurement information may not be used. That is, when the resources are not scarce, the transmitting end allocates best analogue beams of the receiving ends to the receiving ends. However, when frequency and time resources are scarce in a specific analogue beam, some of the receiving ends which select the specific analogue beam as a best analogue beam may not be allocated the best analogue beam. In this case, the transmitting end allocates an analogue beam other than the best analogue beam to the entirety or part of the receiving ends which are allowed to be arbitrarily allocated beams according to the beam measurement information. Herein, the other analogue beams are selected from a certain allocable range indicated by the beam measurement information.

Figure 14:
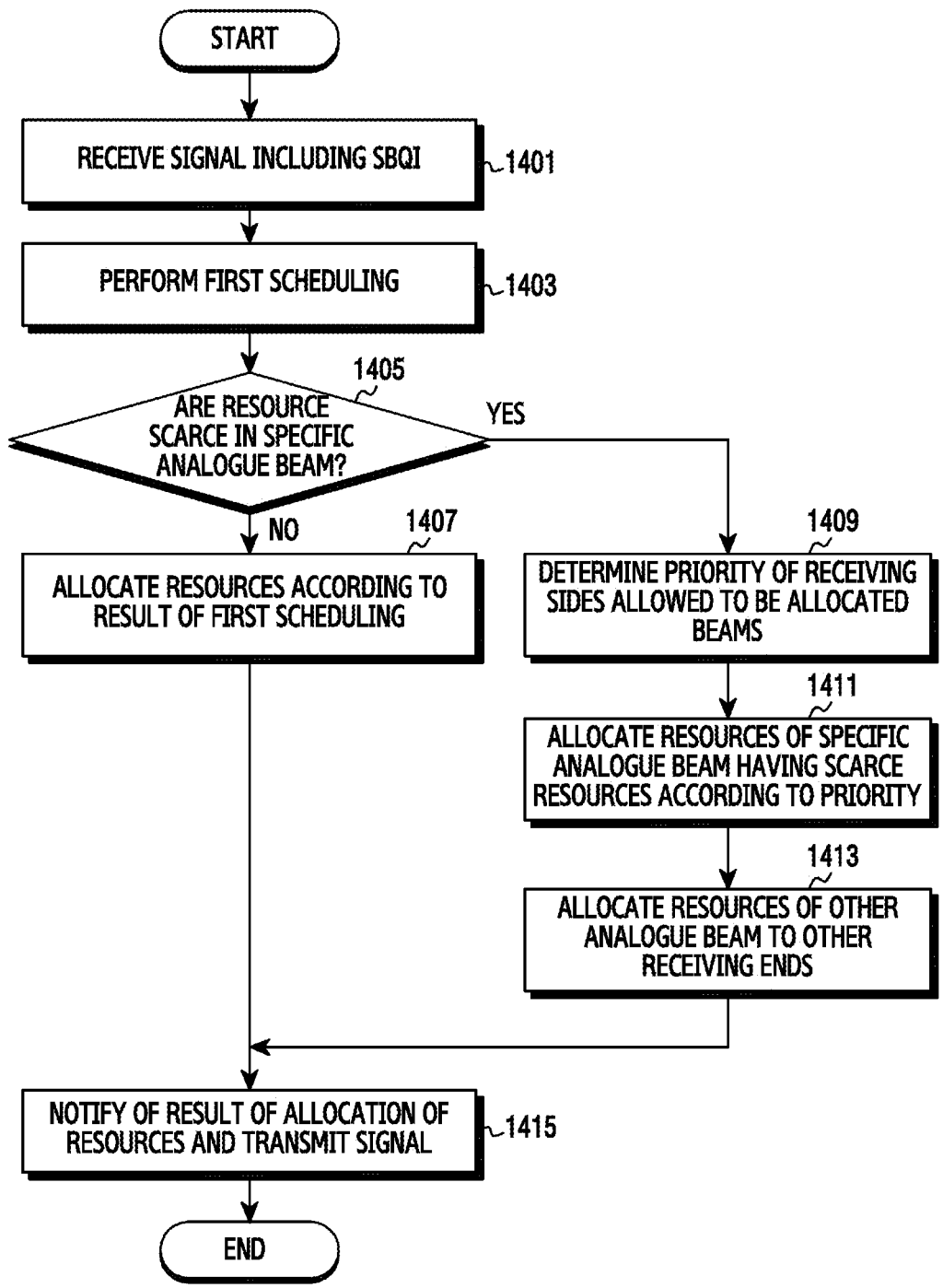
FIG. 14 illustrates a view showing an operation procedure of a transmitting end in a wireless communication system according to another exemplary embodiment of the present disclosure.

FIG. 14 illustrates a view showing an operation procedure of the transmitting end in the wireless communication system according to another exemplary embodiment of the present disclosure. FIG. 14 illustrates the operation procedure of the transmitting end corresponding to the operation procedure of the receiving end shown in FIG. 9 or 10.

Referring to FIG. 14, the transmitting end receives signals including an SBQI from at least one receiving end in step 1401. The SBQI, which is beam measurement information formed of 1 bit, indicates whether a beam other than a beam having a best channel quality is allowed to be allocated. In addition to the SBQI, at least one of information indicating a best analogue beam, HARQ ACK/NACK, a PMI, an RI, and a CQI may further be received.

Next, the transmitting end proceeds to step 1403 to perform first scheduling. For example, the transmitting end arranges the at least one receiving end according to priority and then allocates analogue beam, time, and frequency resources to each receiving end. In this case, the first scheduling is not final scheduling but temporary scheduling, and the result of the first scheduling may be changed in the subsequent steps.

After performing the first scheduling, the transmitting end proceeds to step 1405 to determine whether frequency and time resources to be allocated are scarce in a specific analogue beam or not. That is, the transmitting end determines whether an amount of frequency and time resources to be allocated as a result of the first scheduling exceeds an amount of allocable frequency and time resources in the specific analogue beam.

When the frequency and time resources are not scarce, the transmitting end proceeds to step 1407 to allocate the analogue beam, time, and frequency resources according to the result of the first scheduling. That is, the result of the first scheduling is determined as final scheduling. Thereafter, the transmitting end proceeds to step 1415.

On the other hand, when the frequency and time resources are abundant, the transmitting end proceeds to step 1409 to determine the priority of the receiving ends which are allowed to be arbitrarily allocated beams. The receiving ends which are allowed to be arbitrarily allocated beams refer to at least one receiving end which has transmitted an SBQI set to a positive value (for example, 1). In this case, the priority may be determined only for receiving ends which have selected the specific analogue beam having the scarce resources as a best analogue beam from among the receiving ends allowed to be arbitrarily allocated beams. Alternatively, the priority may be determined for all of the receiving ends which are allowed to be arbitrarily allocated beams regardless of the best analogue beam.

Next, the transmitting end proceeds to step 1411 to allocate the frequency and time resources of the specific analogue beam having the scarce resources according to the priority. As a result, some receiving ends given low priority may not be allocated the resources of the specific analogue beam, that is, the resources of the best analogue beam. According to circumstances, none of the receiving ends which are allowed to be arbitrarily allocated beams may be allocated the resources of the specific analogue beam.

Next, the transmitting end proceeds to step 1413 to allocate the frequency and time resources of an analogue beam other than the specific analogue beam having the scarce resources to a receiving end which is not allocated the resources of the specific analogue beam. In other words, the transmitting end allocates the resources of an analogue beam other than the best analogue beam to the receiving end which determines the specific analogue beam as the best analogue beam but is not allocated the resources of the specific beam analogue. That is, some receiving ends may be allocated an analogue beam other than the best analogue beam.

Thereafter, the transmitting end proceeds to step 1415 to notify the at least one receiving end of the result of the allocation of the resources, and transmit signals according to the result of the allocation of the resources. In this case, the transmitting end may perform beamforming for transmission according to allocation of the analogue beams included in the result of the allocation of the resources.

Figure 15:
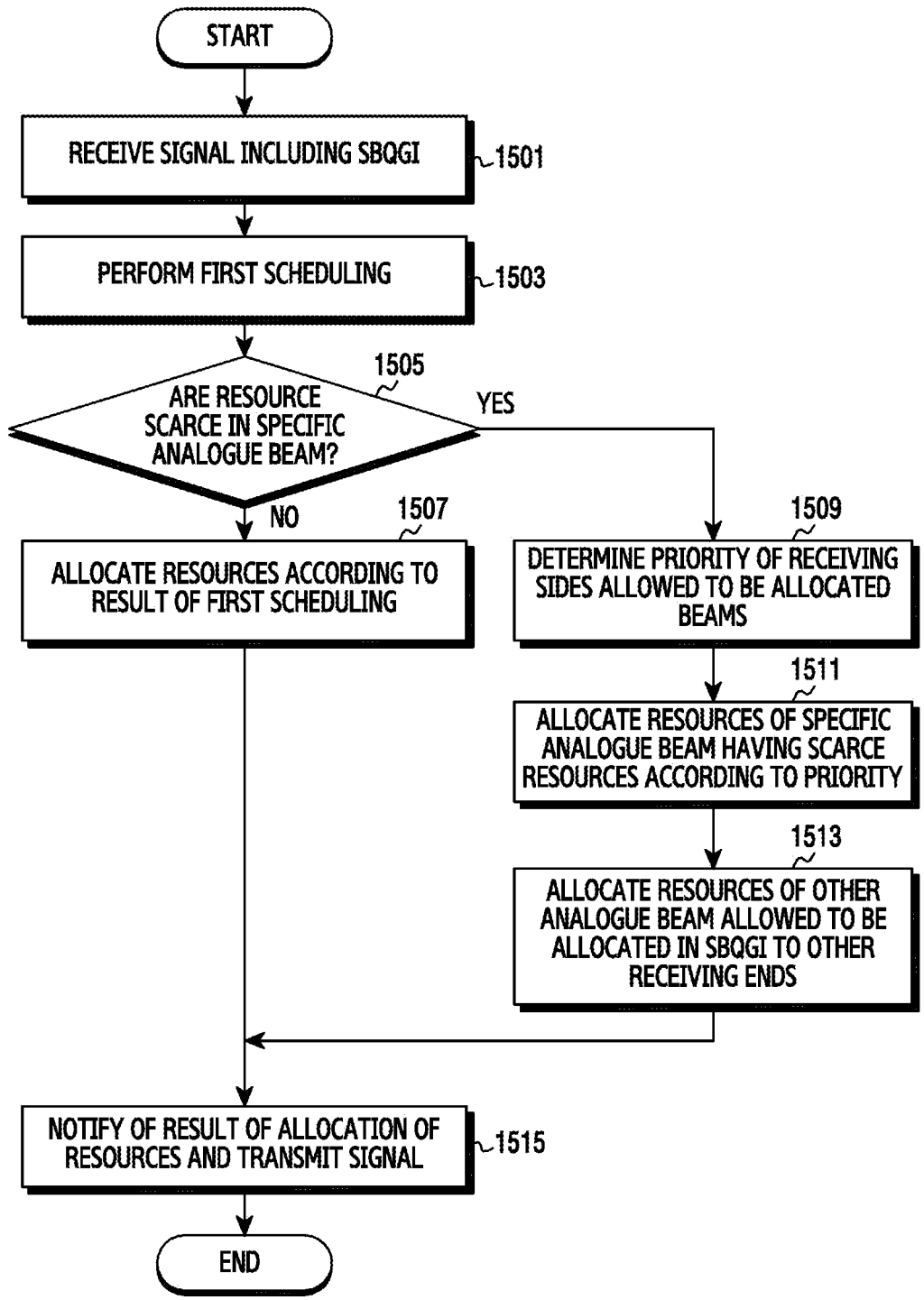
FIG. 15 illustrates a view showing an operation procedure of a transmitting end in a wireless communication system according to another exemplary embodiment of the present disclosure.

FIG. 15 illustrates a view showing an operation procedure of the transmitting end in the wireless communication system according to another exemplary embodiment of the present disclosure. FIG. 15 illustrates the operation procedure of the transmitting end corresponding to the operation procedure of the receiving end shown in FIG. 11.

Referring to FIG. 15, the transmitting end receives signals including an SBQGI from at least one receiving end in step 1501. The SBQGI, which is beam measurement information formed on a group basis, indicates whether a beam other than a beam having a best channel quality that is included in a corresponding group is allowed to be allocated. In addition to the SBQGI, at least one of information indicating a best analogue beam, HARQ ACK/NACK, a PMI, an RI, and a CQI may further be received.

Next, the transmitting end proceeds to step 1503 to perform first scheduling. For example, the transmitting end arranges the at least one receiving end according to priority and then allocates analogue beam, time, and frequency resources to each receiving end. In this case, the first scheduling is not final scheduling but temporary scheduling, and the result of the first scheduling may be changed in the subsequent steps.

After performing the first scheduling, the transmitting end proceeds to step 1505 to determine whether frequency and time resources to be allocated are scarce in a specific analogue beam or not. That is, the transmitting end determines whether an amount of frequency and time resources to be allocated as a result of the first scheduling exceeds an amount of allocable frequency and time resources in the specific analogue beam.

When the frequency and time resources are abundant, the transmitting end proceeds to step 1507 to allocate the analogue beam, time, and frequency resources according to the result of the first scheduling. That is, the result of the first scheduling is determined as final scheduling. Thereafter, the transmitting end proceeds to step 1515.

On the other hand, when the frequency and time resources are abundant, the transmitting end proceeds to step 1509 to determine the priority of the receiving ends which are allowed to be arbitrarily allocated beams. The receiving ends which are allowed to be arbitrarily allocated beams refer to at least one receiving end which has transmitted an SBQGI in which at least one bit is set to a positive value (for example, 1). In this case, the priority may be determined only for receiving ends which have selected the specific analogue beam having the scarce resources as a best analogue beam from among the receiving ends allowed to be arbitrarily allocated beams. Alternatively, the priority may be determined for all of the receiving ends which are allowed to be arbitrarily allocated beams regardless of the best analogue beam.

Next, the transmitting end proceeds to step 1511 to allocate the frequency and time resources of the specific analogue beam having the scarce resources according to the priority. As a result, some receiving ends given low priority may not be allocated the resources of the specific analogue beam, that is, the resources of the best analogue beam. According to circumstances, none of the receiving ends which are allowed to be arbitrarily allocated beams may be allocated the resources of the specific analogue beam.

Next, the transmitting end proceeds to step 1513 to allocate the frequency and time resources of an analogue beam other than the specific analogue beam having the scarce resources to a receiving end which is not allocated the resources of the specific analogue beam. In other words, the transmitting end allocates the resources of an analogue beam other than the best analogue beam to the receiving end which determines the specific analogue beam as the best analogue beam, but is not allocated the resources of the specific beam analogue. In this case, the other analogue beam is one of the beams included in a group corresponding to the bit which is set to the positive value in the SBQGI transmitted from the corresponding receiving end. That is, the transmitting end allocates the resources of the analogue beams in the group which is allowed to be arbitrarily allocated beams to the receiving end which is not allocated the resources of the specific analogue beam.

Thereafter, the transmitting end proceeds to step 1515 to notify the at least one receiving end of the result of the allocation of the resources, and transmit signals according to the result of the allocation of the resources. In this case, the transmitting end may perform beamforming for transmission according to allocation of the analogue beams included in the result of the allocation of the resources.

Figure 16:
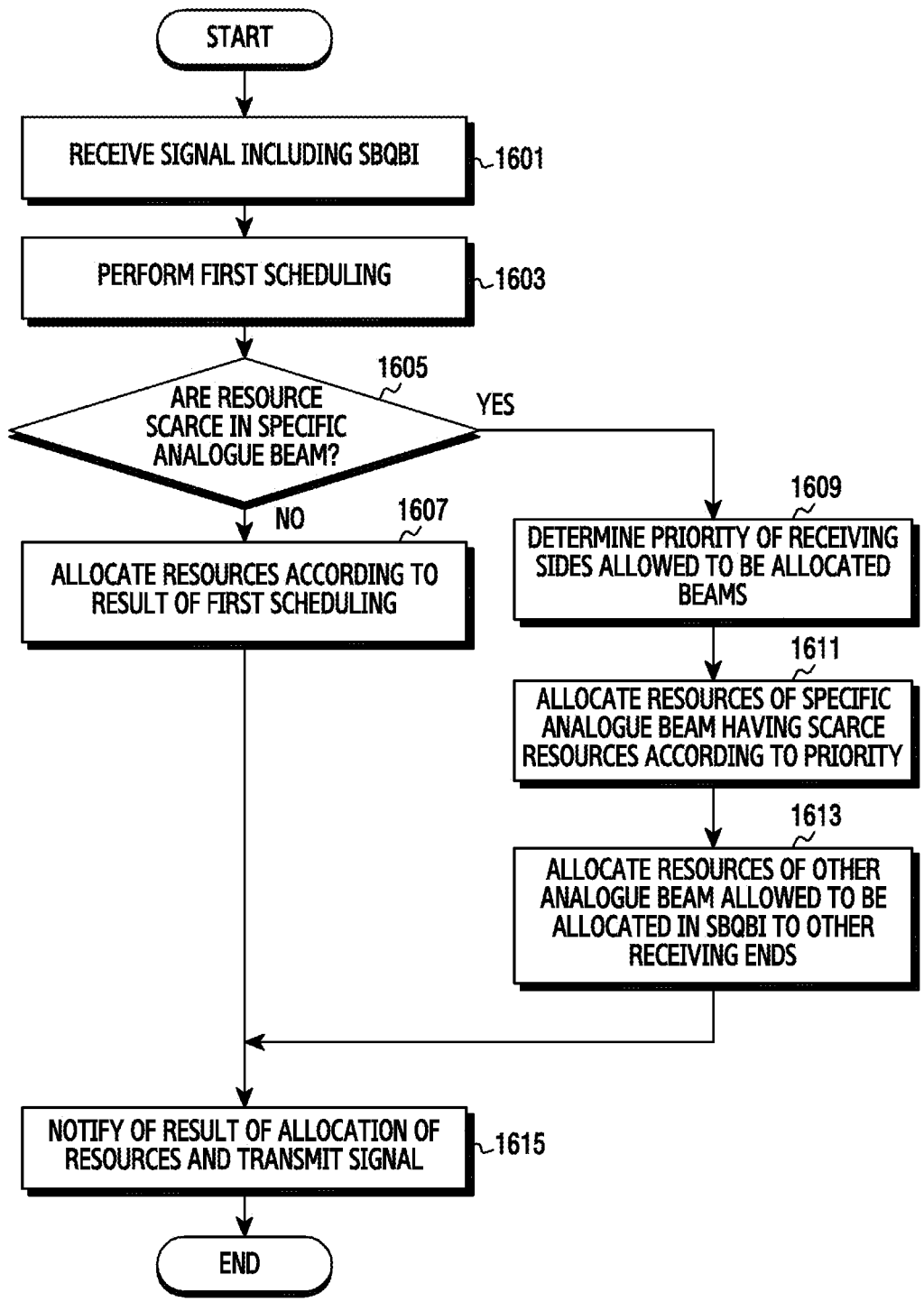
FIG. 16 illustrates a view showing an operation procedure of a transmitting end in a wireless communication system according to another exemplary embodiment of the present disclosure.

FIG. 16 illustrates a view showing an operation procedure of the transmitting end in the wireless communication system according to another exemplary embodiment of the present disclosure. FIG. 16 illustrates the operation procedure of the transmitting end corresponding to the operation procedure of the receiving end shown in FIG. 12.

Referring to FIG. 16, the transmitting end receives signals including an SBQBI from at least one receiving end in step 1601. The SBQBI, which is individual beam measurement information regarding each of the transmission beams, indicates whether each of the transmission beams is allowed to be allocated. In addition to the SBQBI, at least one of information indicating a best analogue beam, HARQ ACK/NACK, a PMI, an RI, and a CQI may further be received.

Next, the transmitting end proceeds to step 1603 to perform first scheduling. For example, the transmitting end arranges the at least one receiving end according to priority and then allocates analogue beam, time, and frequency resources to each receiving end. In this case, the first scheduling is not final scheduling but temporary scheduling, and the result of the first scheduling may be changed in the subsequent steps.

After performing the first scheduling, the transmitting end proceeds to step 1605 to determine whether frequency and time resources to be allocated are scarce in a specific analogue beam or not. That is, the transmitting end determines whether an amount of frequency and time resources to be allocated as a result of the first scheduling exceeds an amount of allocable frequency and time resources in the specific analogue beam.

When the frequency and time resources are not scarce, the transmitting end proceeds to step 1607 to allocate the analogue beam, time, and frequency resources according to the result of the first scheduling. That is, the result of the first scheduling is determined as final scheduling. Thereafter, the transmitting end proceeds to step 1615.

On the other hand, when the frequency and time resources are abundant, the transmitting end proceeds to step 1609 to determine the priority of the receiving ends which are allowed to be arbitrarily allocated beams. The receiving ends which are allowed to be arbitrarily allocated beams refer to at least one receiving end which has transmitted an SBQBI in which at least one bit is set to a positive value (for example, 1). In this case, the priority may be determined only for receiving ends which have selected the specific analogue beam having the scarce resources as a best analogue beam from among the receiving ends allowed to be arbitrarily allocated beams. Alternatively, the priority may be determined for all of the receiving ends which are allowed to be arbitrarily allocated beams regardless of the best analogue beam.

Next, the transmitting end proceeds to step 1611 to allocate the frequency and time resources of the specific analogue beam having the scarce resources according to the priority. As a result, some receiving ends given low priority may not be allocated the resources of the specific analogue beam, that is, the resources of the best analogue beam. According to circumstances, none of the receiving ends which are allowed to be arbitrarily allocated beams may be allocated the resources of the specific analogue beam.

Next, the transmitting end proceeds to step 1613 to allocate the frequency and time resources of an analogue beam other than the specific analogue beam having the scarce resources to a receiving end which is not allocated the resources of the specific analogue beam. In other words, the transmitting end allocates the resources of an analogue beam other than the best analogue beam to the receiving end which determines the specific analogue beam as the best analogue beam, but is not allocated the resources of the specific beam analogue. In this case, the other analogue beam is one of at least one beam corresponding to the bit which is set to the positive value in the SBQBI transmitted from the corresponding receiving end. That is, the transmitting end allocates the resources of an analogue beam which is allowed to be arbitrarily allocated to the receiving end which is not allocated the resources of the specific analogue beam.

Thereafter, the transmitting end proceeds to step 1615 to notify the at least one receiving end of the result of the allocation of the resources, and transmit signals according to the result of the allocation of the resources. In this case, the transmitting end may perform beamforming for transmission according to allocation of the analogue beams included in the result of the allocation of the resources.

Figure 17:
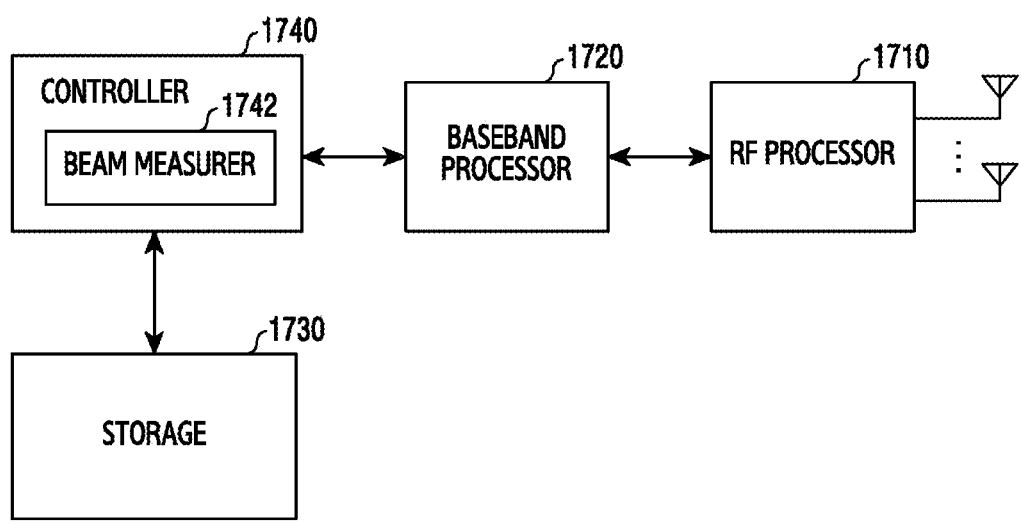
FIG. 17 illustrates a view showing a block configuration of a receiving end in a wireless communication system according to an exemplary embodiment of the present disclosure.

FIG. 17 illustrates a view showing a configuration of a receiving end in a wireless communication system according to an exemplary embodiment of the present disclosure.

Referring to FIG. 17, the receiving end includes a Radio Frequency (RF) processor 1710, a baseband processor 1720, a storage 1730, and a controller 1740.

The RF processor 1710 performs a function to transmit and receive signals through a radio channel, such as convening a band of signals, amplifying, etc. That is, the RF processor 1710 up-converts baseband signals provided from the baseband processor 1720 into RF band signals, and then transmits the signals through an antenna, and down-converts RF band signals received through the antenna into baseband signals. For example, the RF processor 1710 may include a transmission filter, a reception filter 1712, an amplifier, a mixer, an oscillator, a Digital to Analog Converter (DAC), an Analog to Digital Converter (ADC), etc. As shown in FIG. 17, the receiving end may be provided with a plurality of antennas, and the plurality of antennas may configure at least one array antenna. In addition, the RF processor 1710 may include a number of RF chains corresponding to the plurality of antennas. In addition, the RF processor 1710 may perform analog beamforming.

The baseband processor 1720 performs a conversion function between a baseband signal and a bit string according to a physical layer standard of the system. For example, when transmitting feedback information, the baseband processor 1720 generates complex symbols by encoding and modulating a transmission bit string. In addition, when receiving data, the baseband processor 1720 may restore a reception bit string by demodulating and decoding the baseband signals provided from the RF processor 1710. For example, according to an OFDM method, when transmitting feedback information, the bandband processor 1720 generates complex symbols by encoding and modulating the transmission bit string, maps the complex symbols onto subcarriers, and then configure OFDM symbols by performing an Inverse Fast Fourier Transform (IFFT) operation and inserting a Cyclic Prefix (CP). In addition, when receiving data, the baseband processor 1720 divides the baseband signals provided from the RF processor 1710 on an OFDM symbol basis, restores the signals mapped onto the subcarriers by performing an FFT operation, and then restores the reception bit string by demodulating and decoding. In addition, the baseband processor 1720 may perform digital beamforming.

The baseband processor 1720 and the RF processor 1710 may transmit and receive signals as described above. Accordingly, the baseband processor 1720 and the RF processor 1710 may be referred to as a transmitter, a receiver, or a transceiver.

The storage 1730 stores data such as basic programs, application programs, setting data, etc. for the operations of the receiving end. In addition, the storage 1730 provides stored data in response to a request of the controller 1740.

The controller 1740 controls the overall operation of the receiving end. For example, the controller 1740 transmits and receives signals through the baseband processor 1720 and the RF processor 1710. According to an exemplary embodiment of the present disclosure, the controller 1740 includes a beam measurer 1742 to measure channel qualities of beam combinations of transmission beams of the transmitting end and reception beams of the receiving end. According to an exemplary embodiment of the present disclosure, the controller 1740 may generate and transmit beam measurement information indicating that it is possible to allocate the plurality of beams. For example, the controller 1740 may control the receiving end to perform the procedures shown in FIGS. 8 to 12. The operations of the controller 1740 according to an exemplary embodiment of the present disclosure are as follows.

According to an exemplary embodiment, the controller 1740 measures the channel qualities of the beam combinations. Specifically, the controller 1740 receives reference signals which are beamformed for transmission with transmission beams by beamforming for reception with reception beams through the RF processor 1710 and the baseband processor 1720, and measures the channel qualities. In addition, the controller 1740 generates the beam measurement information according to statistics on the channel qualities. The beam measurement information is measurement information regarding a plurality of beams as well as a best analogue beam, and indicates whether all of the transmission beams, a group of the transmission beams, or an individual transmission beam is allowed to be arbitrarily allocated or not. In addition, the controller 1740 transmits the beam measurement information through the RF processor 1710 and the baseband processor 1720. The beam measurement information may have a format of a message.

According to an exemplary embodiment of the present disclosure, the beam measurement information may indicate whether beams other than a beam having a best channel quality are allowed to be allocated or not. In this case, when a first condition in which the channel qualities of all of the beams are greater than or equal to a first threshold value, and a second condition in which similarity between the channel qualities of all of the beams is greater than or equal to a second threshold value are all satisfied, the controller 1740 sets an SBQI to a positive value (for example, 1). According to another exemplary embodiment of the present disclosure, when only one of the first condition and the second condition is satisfied, the SBQI may be set to a positive value. According to another exemplary embodiment of the present disclosure, only one of the first condition and the second condition may be applied.

According to another exemplary embodiment of the present disclosure, the beam measurement information may indicate whether beams other than the beam having the best channel quality that are included in at least one group are allowed to be allocated. In this case, when a first condition in which the channel qualities of all of the beams included in a specific group are greater than or equal to a first threshold value, and a second condition in which similarity between the channel qualities of all of the beams is greater than or equal to a second threshold value are all satisfied, the controller 1740 sets a bit of an SBQGI corresponding to the specific group to a positive value (for example, 1). According to another exemplary embodiment of the present disclosure, when only one of the first condition and the second condition is satisfied, the corresponding bit of the SBQGI may be set to a positive value. According to another exemplary embodiment of the present disclosure, only one of the first condition and the second condition may be applied.

According to another exemplary embodiment of the present disclosure, the beam measurement information may indicate whether each of the transmission beams is allowed to be allocated. In this case, the controller 1740 determines a set of beams satisfying a first condition in which the channel qualities of all of the beams are greater than or equal to a first threshold value and a second condition in which similarity between the channel qualities of all of the beams is greater than or equal to a second threshold value. In addition, the controller 1740 sets bits corresponding to the beams of the set of beams in the SBQBI to a positive value (for example, 1). According to another exemplary embodiment of the present disclosure, when only one of the first condition and the second condition is satisfied, the set of beams may be determined. According to another exemplary embodiment of the present disclosure, only one of the first condition and the second condition may be applied.

Figure 18:
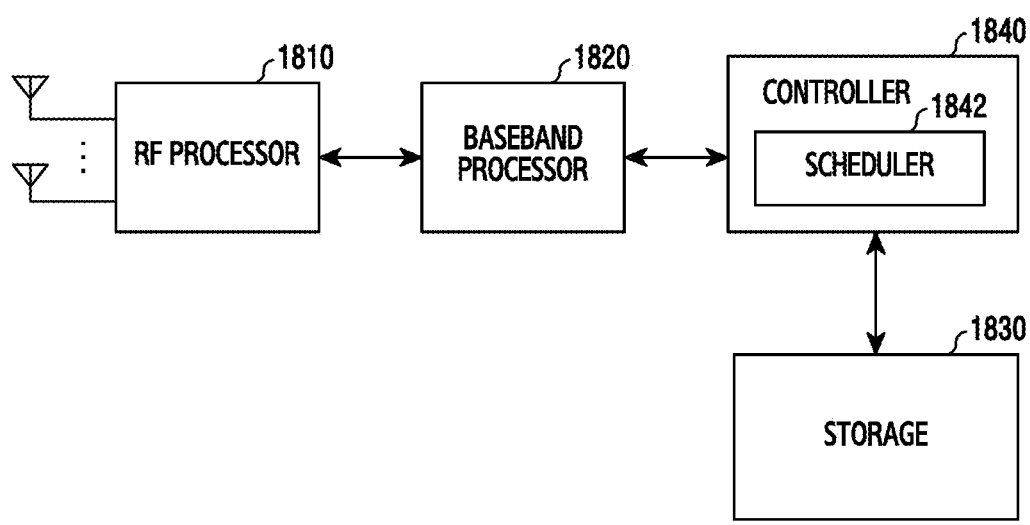
FIG. 18 illustrates a view showing a block configuration of a transmitting end in a wireless communication system according to an exemplary embodiment of the present disclosure.

FIG. 18 illustrates a view showing a block configuration of a transmitting end in a wireless communication system according to an exemplary embodiment of the present disclosure.

Referring to FIG. 18, the transmitting end includes an RF processor 1810, a baseband processor 1820, a storage 1830, and a controller 1840.

The RF processor 1810 performs a function to transmit and receive signals through a radio channel, such as converting a band of signals, amplifying, etc. That is, the RF processor 1810 up-converts baseband signals provided from the baseband processor 1820 into RF band signals, and then transmits the signals through an antenna, and down-converts RF band signals received through the antenna into baseband signals. For example, the RF processor 1810 may include a transmission filter, a reception filter 1812, an amplifier, a mixer, an oscillator, a DAC, an ADC, etc. As shown in FIG. 18, the transmitting end may be provided with a plurality of antennas, and the plurality of antennas may configure at least one array antenna. In addition, the RF processor 1810 may include a number of RF chains corresponding to the plurality of antennas. In addition, the RF processor 1810 may perform analog beamforming.

The baseband processor 1820 performs a conversion function between a baseband signal and a bit string according to a physical layer standard of the system. For example, when transmitting data, the baseband processor 1820 generates complex symbols by encoding and modulating a transmission bit string. In addition, when receiving feedback information, the baseband processor 1820 may restore a reception bit string by demodulating and decoding the baseband signals provided from the RF processor 1810. For example, according to an OFDM method, when transmitting data, the baseband processor 1820 generates complex symbols by encoding and modulating a transmission bit string, maps the complex symbols onto subcarriers, and then configures OFDM symbols by performing an IFFT operation and inserting a CP. In addition, when receiving feedback information, the baseband processor 1820 divides the baseband signals provided from the RF processor 1810 on an OFDM symbol basis, restores the signals mapped onto the subcarriers by performing an FFT operation, and then restores a reception bit string by demodulating and decoding. In addition, the baseband processor 1820 may perform digital beamforming.

The baseband processor 1820 and the RF processor 1810 may transmit and receive signals as described above. Accordingly, the baseband processor 1820 and the RF processor 1810 may be referred to as a transmitter, a receiver, or a transceiver.

The storage 1830 stores data such as basic programs, application programs, setting data, etc. for the operations of the transmitting end. In addition, the storage 1830 provides stored data in response to a request of the controller 1840.

The controller 1840 controls the overall operation of the transmitting end. For example, the controller 1840 transmits and receives signals through the baseband processor 1820 and the RF processor 1810. According to an exemplary embodiment of the present disclosure, the controller 1840 includes a scheduler 1842 to allocate analogue beams based on beam measurement information received from a receiving end. According to an exemplary embodiment of the present disclosure, the controller 1840 may receive the beam measurement information indicating that a plurality of beams are allocable and control to schedule based on the beam measurement information. For example, the controller 1840 may control the transmitting end to perform the procedures shown in FIGS. 13 to 16. The operations of the controller 1840 according to an exemplary embodiment of the present disclosure are as follows.

According to an exemplary embodiment of the present disclosure, the controller 1840 receives beam measurement information through the RF processor 1810 and the baseband processor 1820. The beam measurement information is measurement information regarding a plurality of beams as well as a best analogue beam, and indicates whether all transmission beams, a group of the transmission beams, or an individual transmission beam is allowed to be arbitrarily allocated or not. In addition, the controller 1840 allocates an analogue transmission beam for the receiving end based on the beam measurement information. For example, when frequency and time resources are scarce in a specific analogue beam, the controller 1840 allocates an analogue beam other than the best analogue beam to the entirety or part of the receiving ends which are allowed to be arbitrarily allocated beams based on the beam measurement information. Herein, the other analogue beam is selected from an arbitrarily allocable range indicated by the beam measurement information.

According to an exemplary embodiment of the present disclosure, the beam measurement information may indicate whether beams other than the beam having the best channel quality are allowed to be allocated or not. In this case, the controller 1840 may allocate frequency and time resources of an analogue beam other than a specific analogue beam having scarce resources to a receiving end which is not allocated the resources of the specific analogue beam. Herein, the other analogue beam is one of all of the analogue beams other than the specific analogue beam.

According to another exemplary embodiment, the beam measurement information may indicate whether beams other than the beam having the best channel quality that are included in at least one group are allowed to be allocated or not. In this case, the controller 1840 may allocate frequency and time resources of an analogue beam other than a specific analogue beam having scarce resources to a receiving end which is not allocated the resources of the specific analogue beam. Herein, the other analogue beam may be one of the beams included in a group corresponding to a bit which is set to a positive value in the beam measurement information transmitted by the corresponding receiving end.

According to another exemplary embodiment of the present disclosure, the beam measurement information may indicate whether each of the transmission beams is allowed to be allocated. In this case, the controller 1840 may allocate frequency and time resources of an analogue beam other than a specific analogue beam having scarce resources to a receiving end which is not allocated the resources of the specific analogue beam. Herein, the other analogue beam may be one of at least one beam corresponding to a bit which is set to a positive value in the beam measurement information transmitted by the corresponding receiving end.

Figure 19:
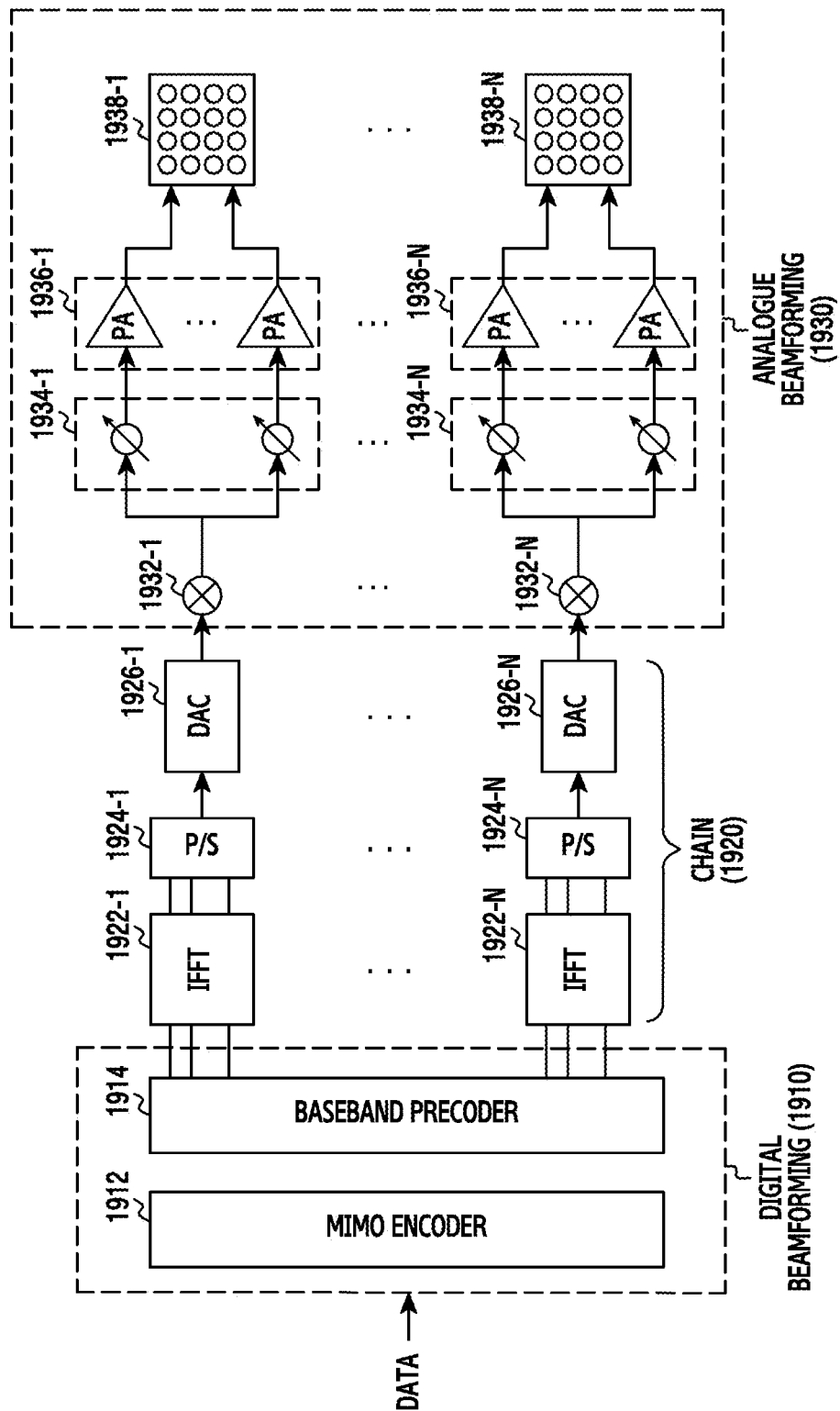
FIG. 19 illustrates a view showing a block configuration for beamforming in a wireless communication system according to an exemplary embodiment of the present disclosure.

As described above, the transmitting end may perform beamforming for transmission. To achieve this, the transmitting end includes a digital beamforming means and an analogue beamforming means. An exemplary embodiment of the digital beamforming means and the analogue beamforming means is as explained below with reference to FIG. 19. FIG. 19 illustrates a view showing a block configuration for beamforming in a wireless communication system according to an exemplary embodiment.

Referring to FIG. 19, a device for beamforming according to an exemplary embodiment of the present disclosure includes a digital beamforming block 1910, a chain block 1920, and an analogue beamforming block 1930. Specifically, the digital beamforming block 1910 includes a Multiple Input Multiple Output (MIMO) encoder 1912 and a baseband precoder 1914. The chain block 1920 includes N chains, and each of the chains includes an IFFT block 1922, a Parallel to Serial (P/S) block 1924, and a DAC 1926. The analogue beamforming block 1930 includes N mixers 1932-1 to 1932-N, N RF beamformers 1934-1 to 1934-N which include a plurality of phase and size conversion elements, N amplifiers 1936-1 to 1936-N which include a plurality of Power Amplifiers (APs), and N array antennas 1938-1 to 1938-N which include a plurality of antenna elements. The structure for beamforming shown in FIG. 19 is merely an example, and may be implemented in various ways.

That is, the RF processor 1810 may include a configuration such as the analogue beamforming block 1930 to perform the analogue beamforming. In addition, the baseband processor 1820 may include a configuration such as the digital beamforming block 1910 to perform the digital beamforming.

The antenna arrays 1938-1 to 1938-N may form analogue beams in all directions within a service coverage, and the directions of the analogue beams may be determined in advance. The receiving end and the transmitting end may have a similar beamforming structure. However, the number of antenna elements configuring the array antennas between the receiving end and the transmitting end may be different. According to the beamforming structure shown in FIG. 19, each of the transmitting end and the receiving end includes the plurality of array antennas 1938-1 to 1938-N and forms analogue beams in each of the array antennas, and thus analogue beams may be selected in each array antenna. In addition, since the plurality of array antennas 1938-1 to 1938-N are used, digital procoding may be performed in a baseband. In the case of FIG. 19, since N array antennas 1938-1 to 1938-N are configured, a precoding vector preferred in a digital codebook may be applied.

Methods based on the embodiments disclosed in the claims or specification of the present disclosure may be implemented in hardware, software, or a combination of hardware and software.

When implemented in software, a computer readable recording medium for storing one or more programs (software modules) may be provided. The one or more programs stored in the computer readable recording medium are configured for execution performed by one or more processors in an electronic device. The one or more programs include instructions for allowing the electronic device to execute the methods based on the embodiments disclosed in the claims or specification of the present invention.

The program (software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may access via an external port to the apparatus performing the exemplary embodiments of the present disclosure. In addition, a separate storage device on the communication network may access the apparatus performing the exemplary embodiments of the present disclosure.

In the exemplary embodiments of the present disclosure described above, the elements included in the present disclosure are expressed in a singular form or a plural form according to an exemplary embodiment. However, the singular form or plural form is just selected to suit to a suggested situation for the sake of easy explanation, and the present disclosure is not limited to the single or plural elements. Even when an element is expressed in a plural form, the element may be provided as a single element, and, even when an element is expressed in a singular form, the element may be provided as a plurality of elements.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method performed by a terminal in a wireless communication system, the method comprising:
    receiving, from a base station, downlink signals for transmission beams; and
    transmitting, to the base station, measurement information including first information and second information, based on the downlink signals,
    wherein the first information is associated with a first transmission beam corresponding to a highest channel quality among the transmission beams,
    wherein the second information is associated with at least one second transmission beam other than the first transmission beam among the transmission beams,
    wherein a channel quality of each of the at least one second transmission beam is greater than a threshold for the measurement information, and
    wherein the threshold is a threshold for grouping measurement results for the at least one second transmission beam.

2. The method of claim 1, further comprising:
    when at least one of a first condition in which channel qualities of all of the transmission beams are greater than or equal to a first threshold value, and a second condition in which similarity between the channel qualities of all of the transmission beams is greater than or equal to a second threshold value is satisfied, determining that all of the transmission beams of the base station are capable of allocating to the terminal.

3. The method of claim 1, further comprising:
determining transmission beams satisfying at least one of a first condition and a second condition as a set of the at least one second transmission beam,
wherein the first condition is that channel qualities of all of the transmission beams are greater than or equal to a first threshold value, and the second condition is that similarity between the channel qualities of all of the transmission beams is greater than or equal to a second threshold value.

4. The method of claim 1, further comprising:
identifying the at least one second transmission beam based on information on whether a channel quality of each of the transmission beams is greater than the threshold or not.

5. A base station in a wireless communication system, the base station comprising:
at least one processor; and
at least one transceiver operatively coupled to the at least one processor,
wherein the at least one processor is configured to:
transmit, to a terminal, downlink signals for transmission beams; and
receive, from the terminal, measurement information including first information and second information, based on the downlink signals,
wherein the first information is associated with a first transmission beam corresponding to a highest channel quality among the transmission beams,
wherein the second information is associated with at least one second transmission beam other than the first transmission beam among the transmission beams,
wherein a channel quality of each of the at least one second transmission beam is greater than a threshold for the measurement information, and
wherein the threshold is a threshold for grouping measurement results for the at least one second transmission beam.

6. The base station of claim 5, wherein the measurement information indicates whether all of the transmission beams of the base station are capable of allocating to the terminal or not.

7. The base station of claim 5, wherein the measurement information indicates whether beams included in at least one group from among all of the transmission beams of the base station are capable of allocating to the terminal.

8. The base station of claim 5, wherein the measurement information indicates whether each of all of the transmission beams of the base station is capable of allocating to the terminal.

9. The base station of claim 5, wherein the at least one processor is further configured to allocate one of the at least one second transmission beam to the terminal, when resources of the first transmission beam are scarce.

10. A terminal in a wireless communication system, the terminal comprising:
at least one processor; and
at least one transceiver operatively coupled to the at least one processor,
wherein the at least one processor is configured to:
receive, from a base station, downlink signals for transmission beams; and
transmit, to the base station, measurement information including first information and second information, based on the downlink signals,
wherein the first information is associated with a first transmission beam corresponding to a highest channel quality among the transmission beams,
wherein the second information is associated with at least one second transmission beam other than the first transmission beam among the transmission,
wherein a channel quality of each of the at least one second transmission beam is greater than a threshold for the measurement information, and
wherein the threshold is a threshold for grouping measurement results for the at least one second transmission beam.

11. The terminal of claim 10, wherein the at least one processor is further configured to:
determine that all of the transmission beams of the base station are capable of allocating to the terminal, when at least one of a first condition in which channel qualities of all of the transmission beams are greater than or equal to a first threshold value, and a second condition in which similarity between the channel qualities of all of the transmission beams is greater than or equal to a second threshold value is satisfied.

12. The terminal of claim 10, wherein the at least one processor is further configured to:
determine transmission beams satisfying at least one of a first condition and a second condition as a set of the at least one second transmission beam,
wherein the first condition is that channel qualities of all of the transmission beams are greater than or equal to a first threshold value, and the second condition is that similarity between the channel qualities of all of the transmission beams is greater than or equal to a second threshold value.

13. The terminal of claim 10, wherein the at least one processor is further configured to:
identifying the at least one second transmission beam based on information on whether a channel quality of each of the transmission beams is greater than the threshold or not.

14. The terminal of claim 10, wherein the measurement information indicates whether all of the transmission beams of the base station are capable of allocating to the terminal or not.

15. The method of claim 1,
wherein the first information comprises an identifier of the first transmission beam, and
wherein the second information comprises index information for the at least one second transmission beam.

16. The base station of claim 5,
wherein the first information comprises an identifier of the first transmission beam, and
wherein the second information comprises index information for the at least one second transmission beam.

17. The terminal of claim 10,
wherein the first information comprises an identifier of the first transmission beam, and
wherein the second information comprises index information for the at least one second transmission beam.

* * * * *